(12) United States Patent
Singhal et al.

(10) Patent No.: US 11,494,459 B2
(45) Date of Patent: Nov. 8, 2022

(54) ANALYZING, CLASSIFYING, AND RESTRICTING USER-DEFINED ANNOTATIONS

(71) Applicant: Meta Platforms, Inc., Menlo Park, CA (US)

(72) Inventors: Nikhil Singhal, Mountain View, CA (US); Roy Koonammave Jose, San Jose, CA (US); Anders Skog, Brooklyn, NY (US); Leonard Chang, San Francisco, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 16/813,463

(22) Filed: Mar. 9, 2020

(65) Prior Publication Data
US 2020/0401635 A1 Dec. 24, 2020

Related U.S. Application Data

(60) Provisional application No. 62/865,802, filed on Jun. 24, 2019.

(51) Int. Cl.
  *G06F 16/958* (2019.01)
  *G06Q 50/00* (2012.01)
  *G06F 40/169* (2020.01)
  *G06K 9/62* (2022.01)

(52) U.S. Cl.
  CPC .......... *G06F 16/958* (2019.01); *G06F 40/169* (2020.01); *G06K 9/6267* (2013.01); *G06Q 50/01* (2013.01)

(58) Field of Classification Search
  CPC ... G06F 16/958; G06F 40/169; G06K 9/6267; G06Q 50/01
  USPC ........................................................ 715/234
  See application file for complete search history.

(56) References Cited

U.S. PATENT DOCUMENTS

| | | | |
|---|---|---|---|
| 10,021,059 B1* | 7/2018 | Rao | H04L 51/08 |
| 10,152,542 B2* | 12/2018 | Nachiappan | G06F 16/9535 |
| 2009/0177670 A1* | 7/2009 | Grenier | G06F 16/9535 |
| 2014/0180788 A1* | 6/2014 | George | G06Q 30/0277 |
| | | | 705/14.41 |
| 2014/0317732 A1* | 10/2014 | Beaufrere | G06F 16/955 |
| | | | 726/22 |
| 2015/0052138 A1* | 2/2015 | Sutton | H04L 51/12 |
| | | | 707/737 |
| 2018/0217980 A1* | 8/2018 | Baron-Palucka | H04L 51/32 |

(Continued)

*Primary Examiner* — Michael Roswell
(74) *Attorney, Agent, or Firm* — Keller Preece PLLC

(57) ABSTRACT

The present disclosure relates to systems, non-transitory computer-readable media, and methods for customizing a set of restrictions for a hashtag or other user-defined annotation that violates guidelines or rules of an online resource based on automated and manual review. In particular, in one or more embodiments, the disclosed systems trigger manual review of user-defined annotations in a social networking system, determine various metrics based on both manual and automated review of content including a particular user-defined annotation, and generate a customized set of restrictions for the user-defined annotation based on those metrics. More specifically, the system can generate and utilize various manual review metrics and a moderated media metric to generate a custom set of restrictions for a user-defined annotation.

20 Claims, 10 Drawing Sheets

(56) References Cited

U.S. PATENT DOCUMENTS

| | | | |
|---|---|---|---|
| 2018/0276396 A1* | 9/2018 | Yablokov | G06F 21/62 |
| 2018/0341877 A1* | 11/2018 | Panattoni | G06N 20/00 |
| 2019/0156434 A1* | 5/2019 | Lin | H04L 67/306 |

* cited by examiner

Fig. 3

Hashtag: #nature
Overall Media Violation Percentage: 0%

Questions
Is the hashtag inherently violating?

Answers
No
Dangerous Org
Bullying
Hate Speech
Nudity/Sexual Terms
Sexual Solicitation
Revenge Porn
Suicidal/Self Harm
Graphic Violence
Regulated Goods
Spam
Coordinating Harm
CEI
Other Abuse Top Media
Top Media Violation Percentage: 0%
Items for preview: 12

1 Caption (English)
Out for a drive in the mountains today! #nature

2 Caption (English)
Beautiful scenery down by the creek this afternoon. #nature

3 Caption (Russian)
На даче с своей семьей. #nature

Recent Media
Recent Media Violation Percentage: 0%
Items for preview: 18

Reset

1 Caption (English)
At the petting zoo! #nature #tortoise

2 Caption (English)
Matt and I at the lake last week. #nature

3 Caption (English)
Cant wait to try out my new tent! #camping #nature

ANALYZING, CLASSIFYING, AND RESTRICTING USER-DEFINED ANNOTATIONS

CROSS-REFERENCE TO RELATED APPLICATION

This application claims the benefit of and priority to U.S. Provisional Application No. 62/865,802, filed Jun. 24, 2019, the entire contents of which are expressly incorporated herein by reference.

BACKGROUND

Recent years have seen significant improvements in communication technology, and particularly in large-scale dissemination of user-generated content. For example, conventional systems can provide users with the ability to share user-generated content, including user-defined annotations, with other users via communication systems including social networking. Some conventional systems utilize manual review of each piece of user-generated content.

Although conventional systems can allow user-defined annotation of user-generated content, such systems have a number of problems in relation to accuracy, efficiency, and flexibility of operation. Conventional systems cannot accurately or flexibly moderate user-defined annotations because of how quickly the usage of user-defined annotations can change. Especially because the use of user-defined annotations is available to all users of a communication platform for various kinds of content posts, and because a user-defined annotation can be created with little time or effort, moderation in conventional systems is unable to keep up with the dynamic meanings of such a high volume of user-defined annotations. Consequently, conventional systems yield inaccurate results because of the slowness of review. The slow speed of review also makes conventional systems unable to adapt to the changes in usage of user-defined annotation.

Further, conventional systems' manual review of each piece of content is inefficient because of the high volume of user-defined annotations. The slow pace and of such review combined with the dynamic meaning of user-defined annotations yields results that can be outdated by the time they are reached. Additionally, conventional systems allocate resources inefficiently by engaging in review of each piece of media.

These along with additional problems and issues exist with regard to conventional communication systems.

BRIEF SUMMARY

Embodiments of the present disclosure provide benefits and/or solve one or more of the foregoing or other problems in the art with systems, non-transitory computer-readable media, and methods for a hashtag review system. That is, the presently disclosed systems and methods provide a user-defined annotation review system that can trigger manual review of media associated with a user-defined annotation (e.g., a hashtag) based on a variety of factors. In one or more embodiments, the annotation review system can determine set of digital media content items that include the user-defined annotation for review. Then in one or more embodiments, based on the manual review of representative media that includes the user-defined annotation, the annotation review system can generate various manual review metrics for the user-defined annotation. Further, the annotation review system can identify a moderated media metric for user-defined annotations. Then, the annotation review system can determine what action to take based on the determined manual review metrics and moderated media metric.

To illustrate, one or more embodiments include a hashtag review system. In particular, one or more embodiments include systems that can identify potentially violating hashtags and determine restrictions for hashtags based on various factors including automated review metrics, manual review metrics, user reviews, and/or associated hashtags. More specifically, in one or more embodiments, the systems can determine a country and language associated with an identified hashtag and present the hashtag and a system-identified set of representative set of posts for review to an administrator specific to the determined region. Then, based on the administrator review and other factors, the system can identify restrictions for the hashtag.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

FIG. 3 illustrates an embodiment of a graphical user interface for reviewing user-generated content in accordance with one or more embodiments.

FIG. 10 illustrates example social graph in accordance with one or more embodiments.

DETAILED DESCRIPTION

Figure 1:
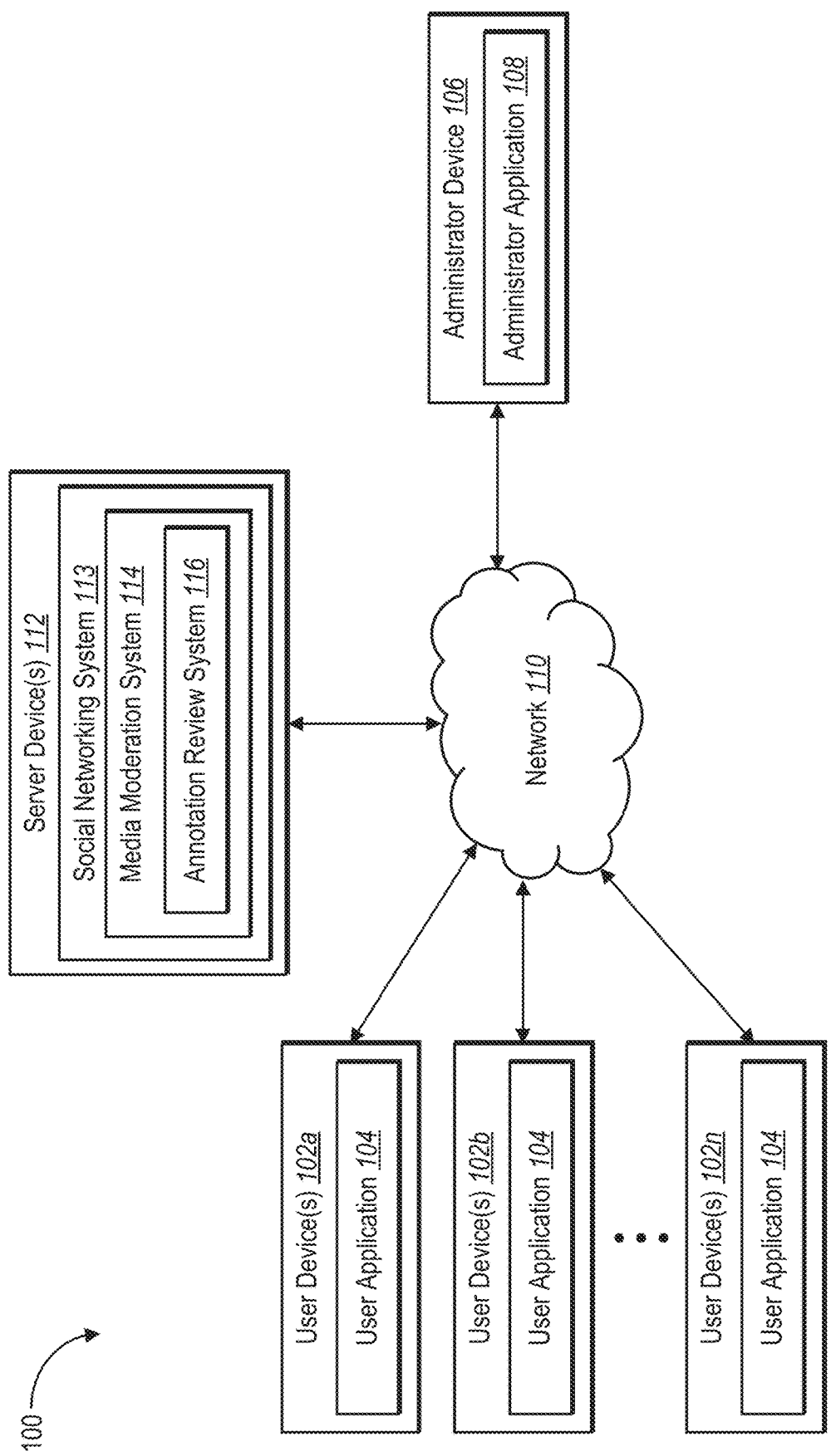
FIG. 1 illustrates a diagram of an environment in which an annotation review system can operate in accordance with one or more embodiments.

This disclosure describes one or more embodiments of an annotation review system that can identify and take action against inappropriate, harmful, or otherwise guideline-violating user-defined annotations (e.g., hashtags). In one or more embodiments, the system can trigger manual review for a user-defined annotation based on various information associated with the user-defined annotation. Then, the annotation review system can generate manual review metrics based on the manual review and a media moderation metric based on various actions associated with the user-defined annotation. Further, in one or more embodiments, the annotation review system can utilize the manual review metrics and the moderated media metric to customize a set of restrictions for the user-defined annotation.

To illustrate, one or more embodiments of the annotation review system can identify hashtags on a social networking website that potentially violate rules or guidelines for the social network. For example, the system can identify the annotations based on an analysis of the actions of an auto-moderation system, user reports of content, a determined geographic location for the annotation, and/or associated hashtags. Then, in one or more embodiments, the annotation review system can select a set of user-generated posts including a potentially violating annotation for review and present the set of posts for manual review to a region-specific administrator. For example, the annotation review system can present the set of content items via a graphical user interface and utilize the administrator input. In one or more embodiments, the annotation review system identifies one or more restrictions for the hashtag based on administrator review and auto-moderation data.

As discussed briefly above, the annotation review system can trigger manual review of a user-defined annotation. In one or more embodiments, the annotation review system can identify user-defined annotations for manual review based on user reports of user-generated content that includes a user-defined annotation. To illustrate, the annotation review system can detect a high number and/or a high percentage of posts including a user-defined annotation with user reports for violating community guidelines and trigger manual review of the user-defined annotation based on that determination. In one or more embodiments, the annotation review system can also analyze a classification of the user-defined annotation, auto-moderation of a user-defined annotation, and/or associated user-defined annotations to determine whether to trigger manual review.

Additionally, the annotation review system can determine content to present to an administrator for manual review of the user-defined annotation. In one or more embodiments, the annotation review system can generate a set of representative content for the user-defined annotation. More specifically, the user-defined annotation can generate a set of content including both recent posts (posts among the most recent content including the user-defined annotation) and top posts (posts among those including the user-defined annotation with the most engagement and/or community interaction). In one or more embodiments, the system can select posts from these categories and generate a content set representative of the user-defined annotation for manual review.

Further, the annotation review system can generate various metrics for the user-defined annotation, including manual review metrics and a moderated media metric. For example, the manual review metrics can reflect the proportion and/or the severity of community violation for posts including the user-defined annotation. For example, the annotation review system can determine manual review metrics reflecting the total violation among manually reviewed content, violation among recent manually reviewed content, and violation among top reviewed content. Additionally, the annotation review system can determine a moderated media metric based at least on analysis of auto-moderation action taken against posts including the user-defined annotation. For example, the annotation review system can determine a moderated media metric for a user-defined annotation based at least in part on a percentage of posts including the user-defined annotation that are deleted based on auto-moderation action. In one or more embodiments, the moderated media metric can also be based on deletion of the consent by user choice. Additionally, in one or more embodiments, the moderated media metric is based on action taken in a predetermined preceding time period, such as the last 30 or 60 days.

The annotation review system can also generate a customized set of restrictions for the user-defined annotation based on the manual review metrics and the moderated media metric for the user-defined annotation. That is, the annotation review system can utilize metrics from manual review and auto-moderation together to determine what action to take for a user-defined annotation. In one or more embodiments, the annotation review system can utilize a classification system to classify the user-defined annotations. Further, the annotation review system can treat different user-defined annotations differently based on their classification. In one or more embodiments, the annotation review system can modify the content page for a user-defined annotation, block a user-defined annotation from search functionality, or remove a content page for a user-defined annotation entirely.

The annotation review system provides many advantages and benefits over conventional systems and methods. For example, by identifying user-defined annotations for review and presenting a set of representative content for the annotation for manual review, the annotation review system improves accuracy and flexibility relative to conventional systems. Specifically, the annotation review system is more widely applicable and can obtain more accurate results because the present systems and methods provide faster and less labor-intensive review. Specifically, the annotation review system improves on prior systems by utilizing a combination of manual and automated review, by generating metrics based on manual review and auto-moderation, and by presenting a representative sample of content for administrator review in an easily-navigable graphical user interface. Accordingly, the presently disclosed systems and methods give the accuracy benefits of auto-moderation and the contextual understanding of manual review. That is, because of the speed of review, the results are accurate to the present context, and the system is consequently useful regardless of changing trends.

Additionally, the annotation review system improves efficiency relative to conventional systems. Specifically, the annotation review system yields improved efficiency by engaging in manual review only when necessary, and by presenting a relevant sample of content for manual review in a convenient graphical user interface. Accordingly, the presently disclosed systems and methods allow faster and more efficient review by requiring fewer resources and less manual review to obtain more accurate results.

As illustrated by the foregoing discussion, the present disclosure utilizes a variety of terms to describe features and advantages of the annotation review system. Additional detail is now provided regarding the meaning of such terms. For example, as used herein, the term "user-defined annotation" refers to annotation, classifier, or other characteristic that a user associates with one or more digital content items. For example, a user-defined annotation may include, but is not limited to, a hashtag, a title, a link, a subject line, a topic, a string of text, a photo tag, file characteristic, metadata, or other characteristic associated with one or more digital content items that is defined by the user. In one or more embodiments, the user-defined annotation refers to a hashtag, subject line, string of text, link, or other annotation that is composed or otherwise included by a user within or together with an associated digital content item and which is visible to other users of the social networking system that access the associated digital content item. Alternatively, in one or more embodiments, the user-defined annotation refers to metadata or other characteristic that is included within the digital content item, but not necessarily visible to other users of the social networking system that access the associated digital content item. Moreover, in one or more embodiments, the user-defined annotation can refer to a particular combination of user-defined annotations associated with one or a combination of digital content items.

Additionally, as used herein, the term "manual review" refers to any review of any content by a person. In particular, the term "manual review" can include administrator review of user-generated content from an online resource. To illustrate, a manual review can include administrator input into a graphical user interface of system-selected user-generated content that reflects whether the content violates terms and conditions or community guidelines for the online resource. Further, manual review may include administrator indication of what provisions the content violates and/or the severity of the violation.

Further, as used herein, the term "manual review metric" refers to any system or standard of measurement for the results of manual review. In particular, the term "manual review metrics" can include values denoting the percentage of violating content from a manual review of content including a user-defined annotation. To illustrate, a manual review metric can include a value reflecting the total violation of content from a manual review, a value reflecting the violation among recent posts from a manual review, and a value reflecting the violation among top posts from a manual review. That is, a total violation score is a manual review metric that reflects the overall or total violation of posts from a manual review, a recent violation score is a manual review metric that reflects the violation among recent posts from a manual review, and a top violation score is a manual review metric that reflects the violation among top posts from a manual review.

Also, as used herein, the term "manual review threshold" refers to a value that must be met or exceeded by a manual review metric in order for the system to take a particular action or proceed to a particular step. In particular, the term "manual review threshold" can include various values that the system analyzes relative to manual review metrics in order to generate a set of customized restrictions for a user-defined annotation. To illustrate, a manual review threshold can include a top threshold corresponding to a total violation threshold corresponding to a total violation score, a recent violation threshold corresponding to a recent violation score, and a top violation threshold corresponding to a top violation score.

Additionally, as used herein, the term "violation percentage" refers to a percentage of a set of items that violate a rule set. In particular, the term "violation percentage" can include a percentage of content posts that violate terms and conditions and/or community guidelines of an online resource. The violation percentage can be based on manual review or automatic moderation. To illustrate, a violation percentage can include a violation percentage for top media associated with the user-defined annotation, a violation percentage for recent media associated with the user-defined annotation, or an overall violation percentage for media associated with the user-defined annotation.

Further, as used herein, the term "media moderation" refers to any moderation of content to determine compliance with or violation of a set of rules. In particular, the term "media moderation" can include auto-moderation of user-generated content for an online resource. To illustrate, media moderation can include automatic action taken based on user-reports, automatic detection of violating content, deletion or other removal of violating content, and modification of violating content.

Also, as used herein, the term "moderated media metric" refers to a value indicative of the commonality and/or severity of moderation taken against a set of content. In particular, the term "moderated media metric" can include a value reflecting the magnitude and/or severity of action taken against content including a certain user-defined annotation, including auto-moderation action. To illustrate, the annotation review system can determine a moderated media metric based on a percentage of posts including a user-defined annotation that have been deleted based on auto-moderation. The moderated media metric can be further based on user deletion of content including the user-defined annotation, classification of the user-defined annotation, other user-defined annotations associated with the user-defined annotation, and/or user reports of the user-defined annotation.

Additionally, as used herein, the term "moderated media threshold" refers to a value that must be met or exceeded by a moderated media metric in order for the system to take a particular action or proceed to a particular step. In particular, the term "moderated media threshold" can include a value that a moderated media metric must meet or exceed in order for the annotation review system to take a certain action or proceed to a certain step in a decision-making process.

Further, as used herein, the term "restriction" refers to a moderation action. In particular, the term "restriction" can include an action that limits the functionality of a user-defined annotation in a social networking context. To illustrate, a restriction can include a block restriction and a modified content page restriction. That is, a block restriction can include removing search functionality and removing the content page for a user-defined annotation. Additionally, a modified content page restriction can include modifying the content page for a user-defined annotation by removing recent posts from the content page, removing a section for recent post from the content page, or any modification that limits the functionality of the content page.

Also, as used herein, the term "classification" refers to a grouping according to qualities or characteristics. In particular, the term "classification" can include grouping user-defined annotations based on manual review metrics and moderated media metrics. To illustrate, a classification can include classes, tiers, groups, categories, brackets, ranks, or other classifiers. For example a classification can group user-defined annotations as very positive, positive, neutral, negative, or very negative.

Additional detail will now be provided regarding the annotation review system in relation to illustrative figures portraying exemplary embodiments. In particular, FIG. 1 illustrates a schematic diagram of an environment 100 within which one or more systems and method described herein can be implemented. As illustrated in FIG. 1, the environment 100 includes user device(s) 102a-n, including user application 104, and an administrator device 106, including administrator application 108. The user device(s) 102a-n and the administrator device 106 communicate, via a network 110, with the server device(s) 112. The server device(s) 112 can include a social networking system 113, which can include a media moderation system 114. In turn, the media moderation system 114 can include the annotation review system 116.

Although FIG. 1 illustrates a particular arrangement of the user device 102, social administrator device 106, network 110, and server device(s) 112, the system can include alternative configurations. For example, the system 100 can include any number of server devices that implement the social networking system 113. Further, in one or more embodiments, the server device(s) 112 communicate directly with the user device 102 or the social networking system 113 by passing the network 110.

Although FIG. 1 illustrates the annotation review system 116 implemented via the server device(s) 112, the demand modulation system 116 can be implemented via other components. For example, the demand modulation system 116 can be implemented in whole, or in part, by the administrator device 106. Similarly, the demand modulation system 116 can be implemented via both the administrator device 106 and the server device(s) 112.

The can include various types of computing devices. For example, the user device(s) 102*a-n* can be a mobile device (e.g., a smart phone), tablet, laptop computer, desktop computer, or any other type of computing device as further explained below with reference to FIG. 8. Additionally, the user application 104 can include any one of various types of user applications. For example, the user application 104 can be an online application (e.g., a web browser), and a user at the user device(s) 102*a-n* can enter a Uniform Resource Locator (URL) or other address directing the web browser to a server device(s) 112. Alternatively, the user application 104 can be a different native application developed for use on the user device(s) 102*a-n*. Similarly, the administrator device 106 can include various types of computing devices, and the administrator application 108 can include any one of various types of administrator applications Additionally, the server device(s) 112 can include one or more computing devices including those explained below with reference to FIG. 8. In some embodiments, the server device(s) 112 comprises a content server. The server device (s) 112 can also comprise an application server, a communication server, a web-hosting server, a social networking server, or a digital content campaign server.

The user device(s) 102*a-n*, administrator device 106*a*, server device(s) 112, and network 110 may communicate using any communication platforms and technologies suitable for transporting data and/or communication signals, including any known communication technologies, devices, media, and protocols supportive of data communications, examples of which are described with reference to FIG. 8.

Although not a requirement, the annotation review system 116 can be implemented as part of a media moderation system 114, which in turn may be implemented as part of a social networking system 113. The media moderation system may perform a variety of digital media moderation actions for a variety of online resources and a variety of content types. In one or more embodiments, the media moderation system 114 moderates digital content posted on a social networking system 113. However, in one or more other embodiments, the annotation review system 116 and the media moderation system 114 may be implemented for a variety of online resources, such as, for example, a database, chat room, shared file explorer, message board, or online community. Additionally, the annotation review system 116 can be implemented on an online resource with or without implementation on a media moderation system 114.

Figure 2:
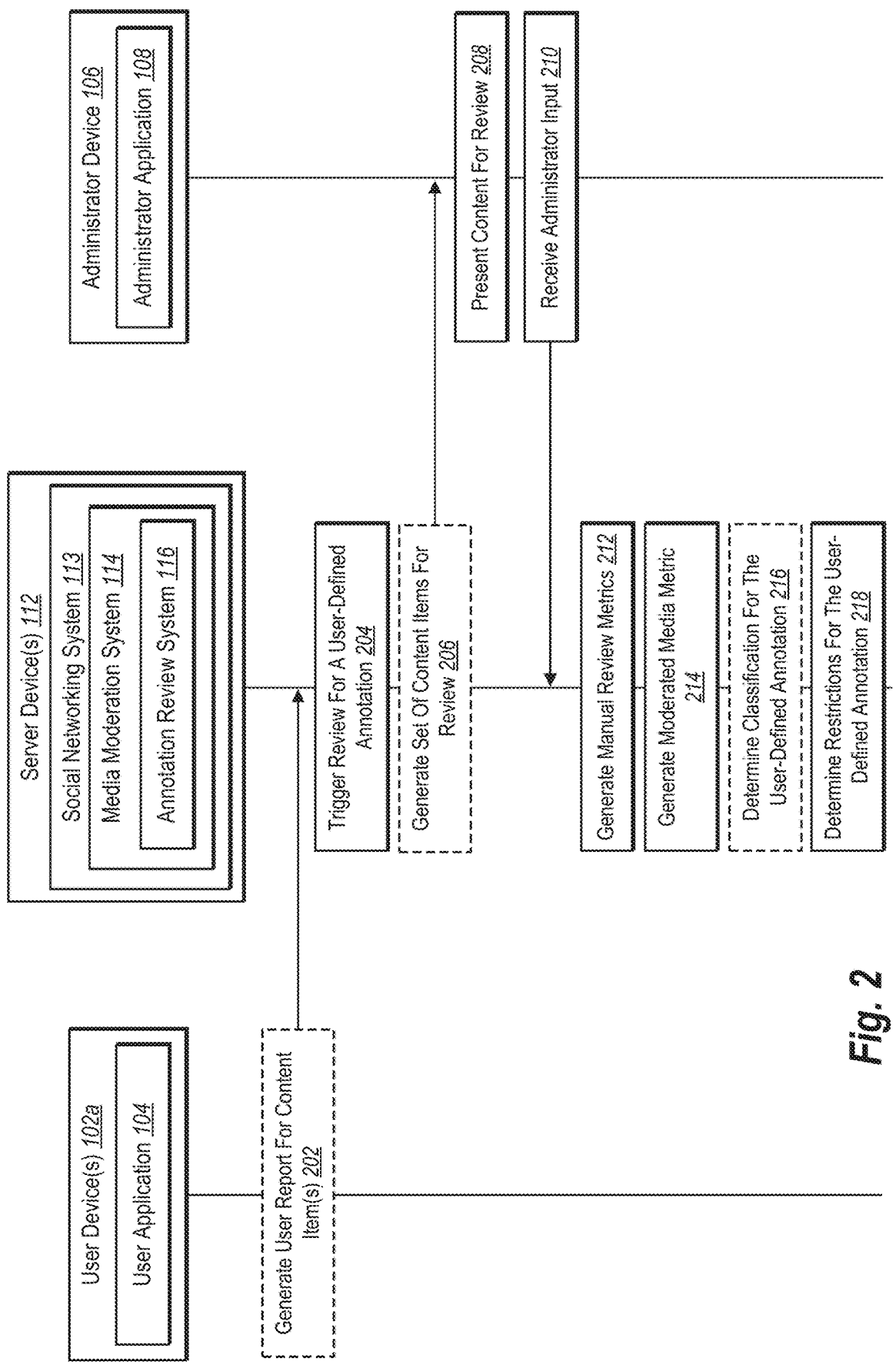
FIG. 2. illustrates a sequence for determining restrictions for a user-defined annotation in accordance with one or more embodiments.

As discussed above, the annotation review system 116 can customize a set of restrictions for a user-defined annotation based on auto-moderation, manual moderation, and other data. For instance, FIG. 2 illustrates an overview for determining restrictions for a user-defined annotation in accordance with one or more embodiments of the annotation review system 116. Specifically, FIG. 2 shows many steps that the annotation review system 116 can perform in determining restrictions for an annotation review system 116, including optional steps indicated by a dashed box.

For example, in one or more embodiments, the user device 102 can perform step 202 of generating a user report for content item(s). In one or more embodiments, the user application 104 can facilitate the generation and transmission of a user report to the annotation review system 116. More specifically, the user report can allow the user to flag content as violating and can allow the user to specify why the content is violating. As mentioned above, while generating and transmitting a user report for content can be part of the process for determining restrictions for a user-defined annotation, but because the annotation review system 116 can trigger review of a user-defined annotation based on a variety of factors, the user report is not necessary.

Additionally, as shown in FIG. 2, the annotation review system 116 can perform step 204 of triggering review for a user-defined annotation. The annotation review system 116 can trigger review based on a combination of a variety of factors. For example, the annotation review system 116 can determine that a high number or percentage of content posts including a user-defined annotation have been reported or that a large number of reports have been submitted for posts including the user-defined annotation. In another embodiment, the annotation review system 116 can determine that a high number or percentage of content posts or have been deleted by an auto-moderation system.

That is, the annotation review system 116 can proactively identify potentially violating user-defined annotations based on their association with deleted or otherwise restricted content. Further, the annotation review system 116 can determine the type of violation associated with the user-defined annotations based both on user reports and on auto-moderation. For example, if a hashtag is frequently included in content posts that are reported or removed based on containing hate speech, the annotation review system 116 can trigger manual review for the user-defined annotation.

Further, in one or more embodiments, the annotation review system 116 can identify user-defined annotations for manual review based on associated user-defined annotations. That is, the annotation review system 116 can determine what user-defined annotations are associated with a first user-defined annotation based on usage, including identifying that user-defined annotations are commonly used together and/or in the same post and/or identifying that user-defined annotations are used in similar contexts and/or with similar or the same content.

The annotation review system 116 can then identify a region or other geographical location associated with the user-defined annotation based on the language and the location from which violating content posts including the hashtag originate. The annotation review system 116 analyzes violating content including the user-defined annotation and its associated content to determine the language and region associated with the content. Because the context and language of a content post are very important in determining whether the post is violating, the annotation review system 116 identifies the language and location of posts that have been found to be violating, rather than of all posts generally, and presents posts from that region to an administrator specific to that region, and can take action specific to that region.

Then, the annotation review system 116 can perform step 206 of generating a set of content items for review. In one or more embodiments, the annotation review system 116 generates a set of representative content that includes the user-defined annotation for manual review. In one or more embodiments, the annotation review system 116 can generate a set of representative content items for the user-defined annotation including both recent posts and top posts. Recent posts are posts most recently uploaded including the user-defined annotation, while top posts are "hot" posts that have recently received high user engagement or interaction. This interaction may include likes, shares, comments, views, or other engagement with the content.

In one or more embodiments, the annotation review system 116 can select a predetermined number of top posts including the user-defined annotation and a predetermined number of recent posts including the user-defined annotation for review. This selection can be random, based on the presently most recent or presently top posts, or based on performance representative of or common for the user-defined annotation. Additionally, in one or more embodiments, the annotation review system 116 excludes posts from selection if they are authored by a user who authored a piece of already-selected content. That is, in one or more embodiments, the annotation review system 116 will select only a predetermined number of posts from any author, such as one or two. This prevents spamming or "hijacking" behavior from biasing the results of the manual review.

Accordingly, the annotation review system 116 can generate a representative set of content including the user-defined annotation for manual review. Further, the content set can be of a pre-determined size and can include a pre-determined number of top posts and a pre-determined number of recent posts. However, in one or more embodiments, the annotation review system 116 can provide a random set of content for review. Upon generating the set of content items, the annotation review system 116 can send the set of content items to the administrator device 106.

Upon receiving the set of content items, the administrator device 106 can perform step 208 of presenting content for review. As discussed briefly above, the annotation review system 116 can determine a region for the user-defined annotation based on usage data by region and further based on language(s) associated with the user-defined annotation. The annotation review system 116 can then present content associated with and/or including the user-defined annotation for review at an administrator device 106 corresponding to the determined region. As will be discussed in greater detail with regard to FIG. 3, the administrator device can present the content for review in a graphical user interface that facilitates quick and accurate response. Then, the administrator device 116 can perform the step 210 of receiving administrator input and can send that administrator input to the annotation review system 116.

Upon receiving the administrator input, the annotation review system 116 can perform step 212 of generating manual review metrics. For example, the annotation review system 116 can determine various manual review metrics based on the administrator review of the various content items. As discussed briefly above, the annotation review system 116 can analyze manual review of the set of content items to determine various metrics for use in generating a set of restrictions for the user-defined annotation. For example, the annotation review system 116 can generate a total violation score, a recent violation score, and a top violation score. As discussed above, a total violation score is a manual review metric that reflects the overall or total violation of posts from a manual review, a recent violation score is a manual review metric that reflects the violation among recent posts from a manual review, and a top violation score is a manual review metric that reflects the violation among top posts from a manual review.

The annotation review system 116 can also perform step 214 of generating a moderated media metric. The annotation review system 116 can determine the moderated media metric based on the magnitude and/or severity of action taken against content including the user-defined annotation. Further, the moderated media metric can be determined based on action taken in a predetermined preceding time period, such as the last 30 or 60 days. For example, in one or more embodiments, the moderated media metric is based at least on a delete percentage of content that includes the user-defined annotation. This deletion can be the consequence of auto-moderation or based on user choice. Additionally, in one or more embodiments, moderated metric is further based on the status of related user-defined annotations, user reports, or classification of the user-defined annotation. Accordingly, the moderated media metric can quantify action taken with regard to content including with the user-defined annotation for all use types. Consequently, the moderated media metric is useful across contexts.

Additionally, in one or more embodiments, the annotation review system 116 performs step 216 of determining a classification for the user-defined annotation. As discussed briefly above, the annotation review system 116 can utilize a classification system for user-defined annotations. These classifications may be referred to as classes, tiers, groups, categories, brackets, ranks, or other classifiers. For example, user-defined annotations can be classified as very positive, positive, neutral, negative, or very negative. In one or more embodiments, these classifications can be numbered, named, or otherwise labelled.

The annotation review system 116 can utilize a prior classification of a user-defined annotation to determine restrictions for the user-defined annotation. Additionally, the annotation review system 116 can perform step 216 of determining a classification for the user-defined annotation. That is, the annotation review system 116 can update the classification of a user-defined annotation based on manual review metrics, a moderated media metric, the prior classification of the user-defined annotation, user reports of content including the user-defined annotation, and/or related or associated user-defined annotations. However, the annotation review system 116 need not necessarily re-classify the user-defined annotation.

Upon generating manual review metrics and a moderated media metric as described above, the annotation review system 116 can perform step 218 of determining restrictions for the user-defined annotation. As will be described in greater detail below with regard to FIG. 4, the annotation review system 116 can utilize the moderated media metric and the manual review metrics to determine what action to take with regard to the user-defined annotation. Metrics reflecting more violation and more severe violation can cause the annotation review system 116 to generate restrictions with greater severity.

As discussed above, in one or more embodiments, the annotation review system 116 presents content for manual review in a graphical user interface. FIG. 3 illustrates an example embodiment of a graphical user interface 300 for reviewing user-generated content. In one or more embodiments, the annotation review system 116 presents this graphical user interface, via the administrator device 106, to facilitate manual review of content associated with a particular user-defined annotation.

As shown in FIG. 3, the graphical user interface 300 can include a questions indicator 302 and an answers indicator 304. In one or more embodiments, the graphical user interface 300 can receive user input indicating the answer to the questions presented in the questions indicator 302 via user interaction with the answers indicator 304. This user input can be given via a variety of user interactions in a variety of implementations of the graphical user interface 300.

Additionally, as shown in FIG. 3, the graphical user interface 300 can include a heading bar 306. The heading bar 306 can include an indication of the user-defined annotation currently included in the graphical user interface 300. Additionally, the heading bar 306 can include other information or status indicators.

For example, as shown in FIG. 3, the heading bar 306 can also include an overall media violation percentage counter 308. The overall media violation percentage counter 308 can include an indication of the overall or total media violation percentage based on administrator interaction with the graphical user interface 300 and can dynamically update and change as the graphical user interface 300 receives more interaction from the administrator.

Further, as shown in FIG. 3, the heading bar 306 can include a reset button 310. Upon receiving user interaction at the reset button 310, the annotation review system 116 can reset the graphical user interface to a "default" state or a state before any interaction was received from the administrator.

Additionally, as shown in FIG. 3, the graphical user interface 300 can include a top media review area 312, which includes top content including the user-defined annotation for manual review. The top media review area 312 also includes a heading area including a count of items for review, and a title. The graphical user interface 300 can receive user interaction at the top media review area 312 indicating whether the content is violating and how it is violating. That is, the annotation review system 116 can receive administrator indication as to what category of violation the posts fall into. Additionally, in one or more embodiments, the top media review area 312 can receive user indication of the severity of violation.

Further, upon receiving administrator input indicating that content is violating, the annotation review system 116 can modify the appearance of that post within the graphical user interface 300. For example, in response to the administrator input, the annotation review system 116 can cause the portion of the graphical user interface including the post to be shaded, hidden from view, struck out, or otherwise modified.

The top media review area 312 can include the top media violation percentage counter 313. As the administrator reviews content in the top media review area 312, the top media violation percentage counter 313 can dynamically update to reflect the percentage of violating media flagged in the top media review area 312.

The graphical user interface 300 can also include a recent media review area 314, which functions similarly to the top media review area 312 but includes recent content for manual review rather than top content. As shown in FIG. 3, the recent media review area 314 can include the recent media violation percentage counter 315. In response to receiving input indicating that a piece of content is violating, the recent media violation percentage counter 315 can dynamically update to reflect the percentage of content currently flagged in the top media review area 312.

Figure 4:
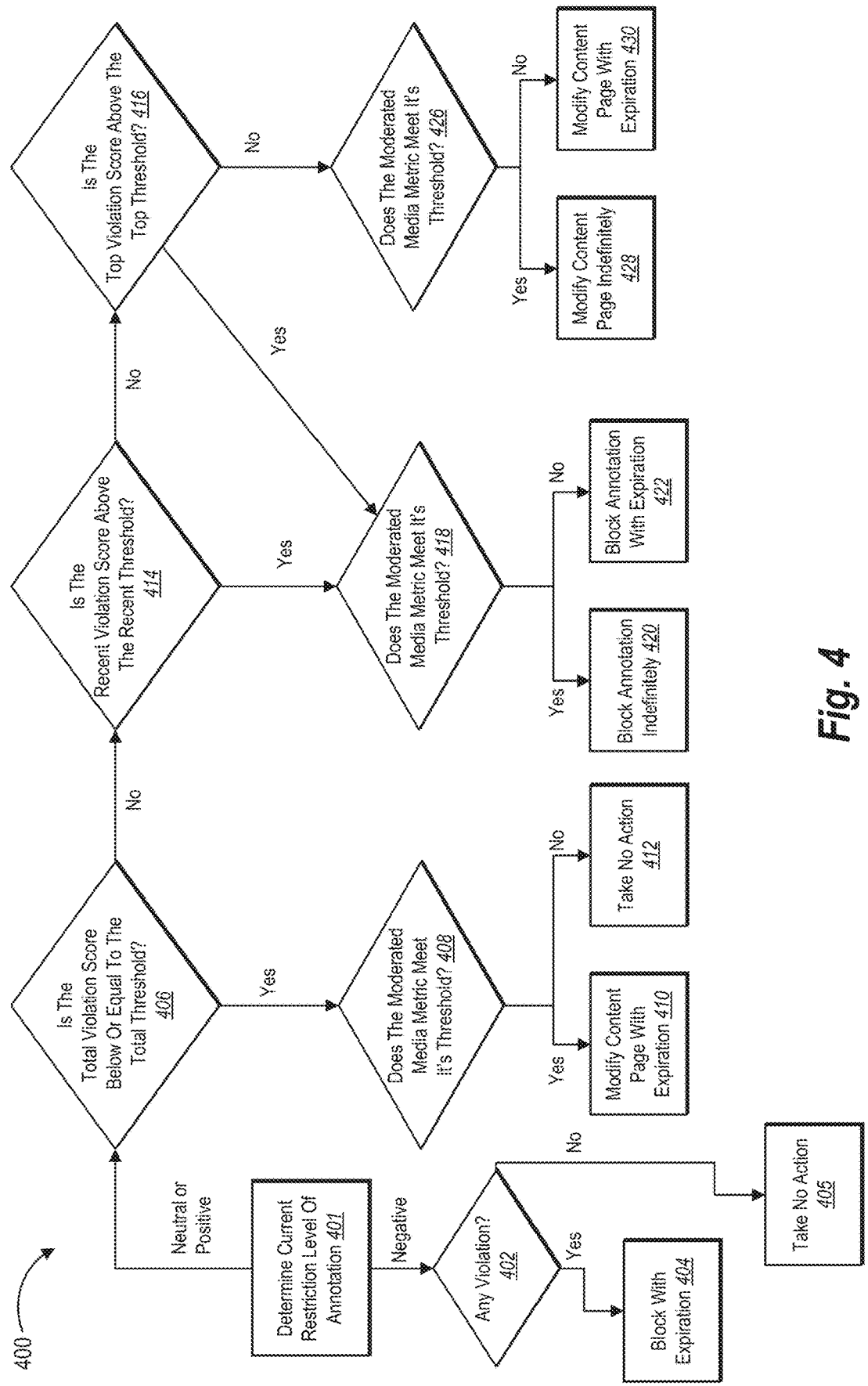
FIG. 4 illustrates a flowchart for an example decision process for an annotation review system in accordance with one or more embodiments.

FIG. 4 illustrates a flowchart for a decision process 400 for an embodiment of the annotation review system 116. As discussed above, in one or more embodiments, the annotation review system 116 can divide user-generated content associated with a user-defined annotation into "top" content and "recent" content and can determine various manual review metrics based on these classifications, such as a total violation score, a recent violation score, and a top violation score. Further, as described in detail above, the annotation review system 116 can generate a moderated media metric for a user-defined annotation.

As shown in FIG. 4, the decision process 400 can begin at step 401 of determining the current restriction level of a user-defined annotation. As discussed above, the annotation review system 116 can utilize a classification system for user-defined annotations. Additionally, the annotation review system 116 can treat user-defined annotations differently based on their classification. For example, in one or more embodiments, the annotation review system 116 treats user-defined annotations differently depending on whether they are classified as negative, or as neutral or positive.

If the annotation review system 116 determines that the user-defined annotation has a negative classification, then the annotation review system 116 can proceed to step 402 of determining whether there is any violation in content associated with the user-defined annotation. In one or more embodiments, the user-defined annotation may determine whether there is any violation in the manual review of the "top" content or may determine whether there was any violation in the manual review at all.

Then, if the annotation determines that there is at least one violation in the relevant content, the annotation review system 116 can proceed to step 404, blocking the annotation with expiration. In one or more embodiments, the annotation review system 116 can set an expiration for one or more set restrictions. For example, the annotation review system 116 can determine an expiration date based on the extent or severity of the violation or based on the type of violation. Additionally, in one or more embodiments, the annotation review system 116 utilizes a standardized period of restriction before expiration.

In one or more embodiments, upon expiration of the restriction, the annotation review system 116 removes the restriction and place the user-defined annotation in a neutral classification. The annotation review system 116 can also remove the restriction and impose another restriction in its place. For example, upon expiration of a block restriction, the annotation review system 116 can remove the block restriction but impose a modified content page restriction pending updated review, pending another expiration period, or indefinitely.

Returning to step 401, if the annotation review system 116 determines that the user-defined annotation has a neutral or positive classification, the annotation review system 116 can perform step 406 of determining whether the total violation score is below or equal to the total threshold. That is, based on administrator input during manual review, the annotation review system 116 can determine a manual review metric for the total violation of a user-defined annotation. In one or more embodiments, this manual review metric can be a total violation score and is based at least on the total percentage of reviewed content marked as violating by the administrator. Then, the annotation review system 116 compares this total violation score to a threshold value for total violations called the "total threshold." In one or more embodiments, the total threshold may be 20% total violation from manual reviews.

In one or more embodiments, the annotation review system 116 can utilize a pre-determined threshold set by an administrator of the social networking system 113 to allow administrator control of the proportionality of punishments. In one or more other embodiments, the annotation review system 116 can dynamically adjust various thresholds, including the total threshold, in response to effectiveness of determined and imposed restrictions.

If the annotation review system 116 determines that the total violation score is below or equal to the total threshold, the annotation review system 116 can proceed to step 408 of determining whether the moderated media metric meets its threshold. As the annotation review system 116 utilizes the moderated media metric to determine restrictions to impose in a variety of contexts, it is important to note that the annotation review system 116 can utilize different media metric thresholds in different contexts. That is, the threshold in step 408 need not be the same as the threshold in step 418 or 426, discussed in greater detail below.

If the annotation review system 116 determines that the moderated media metric meets or exceeds the threshold, it can perform step 410 of assigning a restriction to modify the content page for the user-defined annotation with expiration. As will be discussed in greater detail below with regard to FIGS. 5A-5B, the social networking system 113 can include content pages for user-defined annotations with various user-generated content that features the user-defined annotation. As discussed above, the expiration can be pre-determined or based on a variety of factors.

The annotation review system 116 can modify the content page in a variety of ways. In one or more embodiments, the annotation review system 116 removes "recent" posts from the user-defined annotation content page. This is particularly effective when a typically benign user-defined annotation is being "hijacked" or otherwise spammed with content atypical for the user-defined annotation.

If the annotation review system 116 determines that the moderated media metric does not meet its threshold, the annotation review system 116 can perform step 412 of taking no action for the user-defined annotation. That is, in one or more embodiments, if the annotation review system 116 determines at step 406 that the total violation score is equal to or below a total threshold and that the moderated media metric is below its threshold, then the annotation review system 116 will determine an empty set of restrictions for the user-defined annotation.

Returning to step 406, if the annotation review system 116 determines that the total violation score is not below or equal to the total threshold, that is, that the total violation score is above the total threshold, then the annotation review system 116 can perform step 414 of determining whether the recent violation score is above the recent threshold. That is, as discussed above with regard to 406, the annotation review system 116 can, based on administrator input during manual review, determine a manual review metric for the violations within a "recent" category recent posts including the user-defined annotation. In one or more embodiments, the recent threshold is 66% of recent posts flagged as violating in the manual review. As discussed above with regard to FIG. 3, in one or more embodiments, the annotation review system 116 can present the most recent content posts including a user-defined annotation for manual review by an administrator. Then, based on the manual review, the annotation review system 116 can generate a recent violation score. In one or more embodiments, the recent violation score is a manual review metric and is based at least on the percentage of reviewed recent content marked as violating by the administrator. Then, the annotation review system 116 compares this recent violation score to a threshold value for total violations called the "recent threshold."

If the annotation review system 116 determines that the recent violation scores is not above the recent threshold, then the annotation review system 116 can proceed to step 416 of determining whether the top violation score is above the top threshold. Like above, the annotation review system 116 can present "top" content for manual review and generate a top violation score based at least on the violating percentage of posts from the "top" group. In one or more embodiments, the top threshold can be 0% violating posts in the top group—that is, any violation at all will exceed the threshold. As mentioned above with regard to FIG. 3, top posts for a user-defined annotation can be determined based on various forms of engagement with the post, including comments, shares, likes, or other engagement with the post. Then, the annotation review system 116 can determine a top violation score based on the manual review of top posts and based at least in part on a violation percentage of posts in the top group. Then, if the annotation review system 116 either (1) determines at step 414 that the recent violation score is above the recent violation threshold, or (2) determines at step 416 that the top violation score is above the top threshold, then the annotation review system 116 can proceed to step 418 of determining whether the moderated media metric meets its threshold.

Further, if the annotation review system 116 determines that the moderated media metric does meet its threshold, the annotation review system 116 can proceed to step 420 of blocking the annotation indefinitely. However, if the annotation review system 116 determines that the moderated media metric is below its threshold, then the annotation review system 116 can proceed to step 422 of blocking the annotation with expiration. In one or more embodiments, blocking the annotation can remove search functionality for the user-defined annotation and remove the content page for the user-defined annotation. A block restriction can also prevent content including the annotation from promotion in an "Explore" interface.

Returning to step 416, if the annotation review system 116 determines that the top violation score is not less than or equal to the top threshold, then the annotation review system 116 can proceed to step 426 of determining whether the moderated media metric meets its threshold. As discussed previously, the threshold for the moderated media metric utilized at step 426 need not be the same as the thresholds utilized in step 408 or in step 418. If the annotation review system 116 determines that the moderated media metric does meet (or exceed) its threshold, then the annotation review system 116 can proceed to step 428 of modifying its content page indefinitely. However, if the annotation review system 116 determines that the moderated media metric is below its threshold, then the annotation review system 116 can proceed to step 430 of modifying its content page with expiration.

As will be discussed below with regard to FIGS. 5A-5B, in one or more embodiments, modifying a content page for a user-defined annotation can include removing a "Recent" portion of the content page and including a violation message. In one or more other embodiments, modifying a content page can also include determining the type of content typically associated with violation and removing those specified types of content from the content page, such as video, photo, or text posts. The annotation review system 116 can also modify a content page by removing options from the content page, such a sharing content from the page.

Figure 5B:
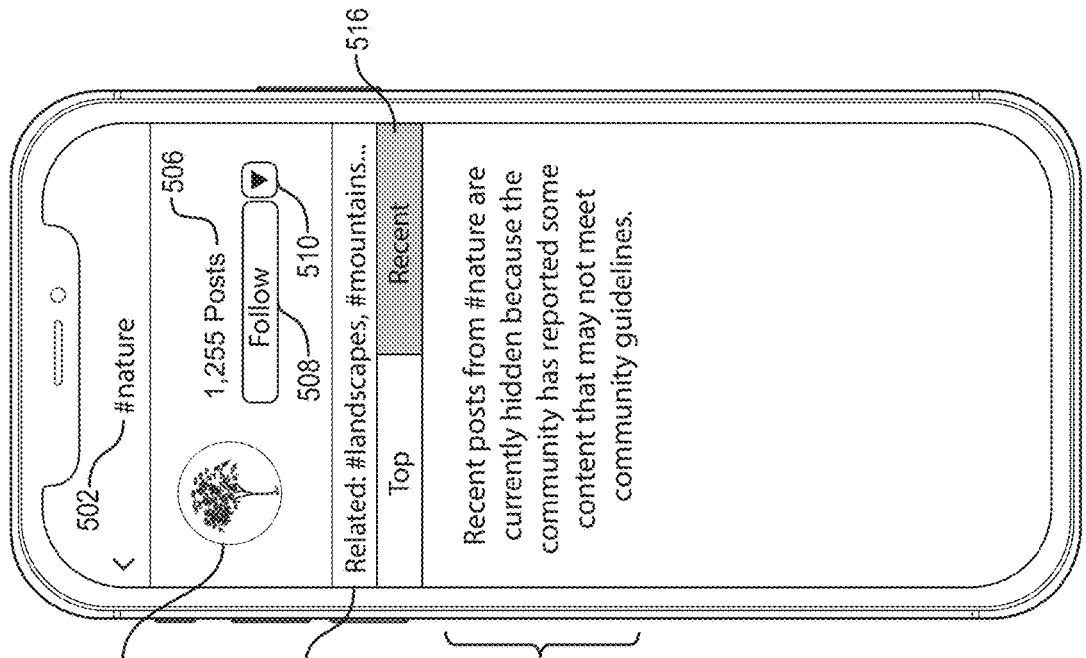
FIGS. 5A-5B illustrates an embodiment of a graphical user interface for a content page for a user-defined annotation.
Figure 5A:
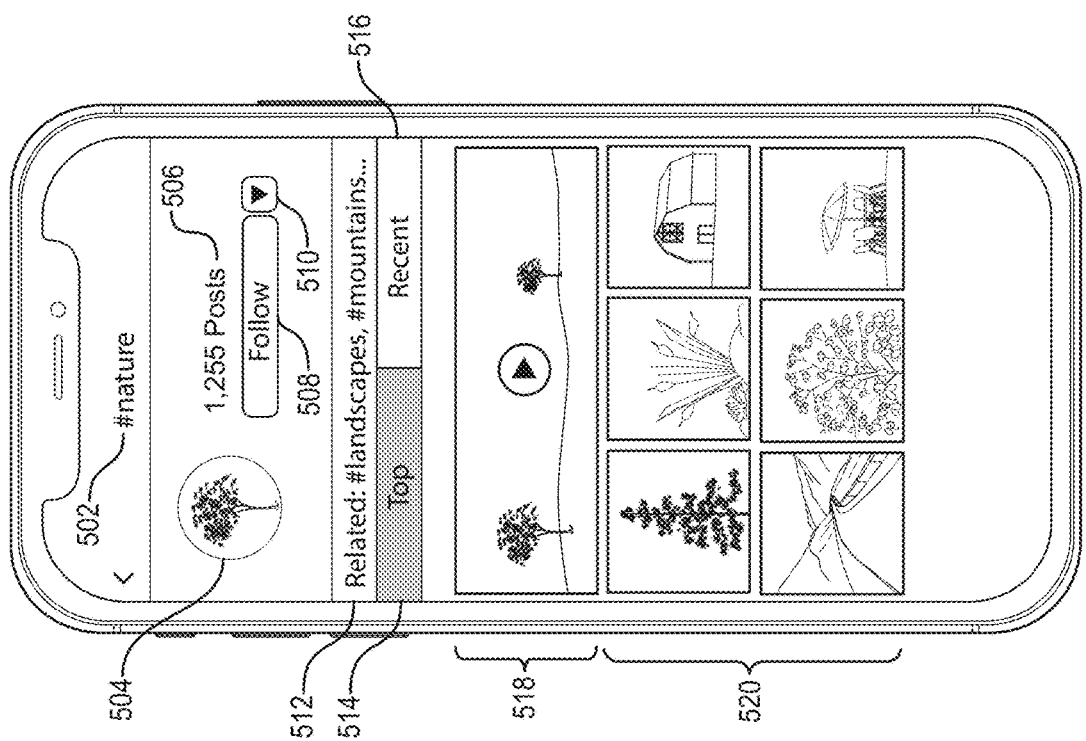

FIGS. 5A and 5B show an example embodiment of a modified content page for a user-defined annotation. More specifically, FIG. 5A shows a normal "Top" section of a content page for the user-defined annotation "#nature." FIG. 5B shows a modified 'Recent" section of a content page for the user-defined annotation "#nature" as described briefly above.

As shown in FIGS. 5A-5B, the content page can include a user-defined annotation title 502. In FIGS. 5A-5B, the user-defined annotation title 502 is illustrated as being presented at the top center of the content page, but it could be presented in any part of the content page indicating a title or label corresponding to the entire content page.

As illustrated in FIGS. 5A-5B, the content page can include a heading area including a user-defined annotation icon 504, a post count 506, a follow button 508, a more options button 510 and a related annotation list 512. While FIGS. 5A-5B show the content page organized with these features and options in a heading bar, it will be appreciated that the content page can be organized in any of a variety of ways.

Additionally, as shown in FIGS. 5A-5B, the content page can include a "Top" display button 514 and a "Recent" display button 516. Upon user interaction with the "Top" display button 514, the annotation review system 116 can present the "Top" portion of the content page. Similarly, upon receiving user interaction with the "Recent" display button 516, the annotation review system 116 can present the "Recent" portion of the content page. Accordingly, FIG. 5A shows the "Top" portion of a content page, while FIG. 5B shows the "Recent" portion of a content page in accordance with various modifications in response to restrictions imposed by the annotation review system 116.

More specifically, FIG. 5A shows a video content area 518 and a photo content area 520. The content page can display the "top" user-generated content that includes the user-defined annotation in these content areas. As discussed above, the annotation review system 116 can determine the top content based on user engagement, including likes, shares, and/or comments on the content posts. The annotation review system 116 can then present the top content in the video content area 518 and a photo content area 520. Further, in one or more other embodiments, the content page can include content areas for various other types of content, such as text-based content, gifs, or multi-media content.

FIG. 5B shows a modified "Recent" portion of a content page in accordance with a restriction imposed by the annotation review system 116 on the user-generated annotation. That is, instead of presenting content areas with user-generated content including the user-defined annotation, the "Recent" portion of the content page shows a violation notification 522. In FIG. 5B, the violation notification 522 reads, "Recent posts from #nature are currently hidden because the community has reported some content that may not meet community guidelines." In one or more other embodiments, the violation notification 522 can include various other explanations as to the absence of recent content in the "Recent" page.

Figure 6:
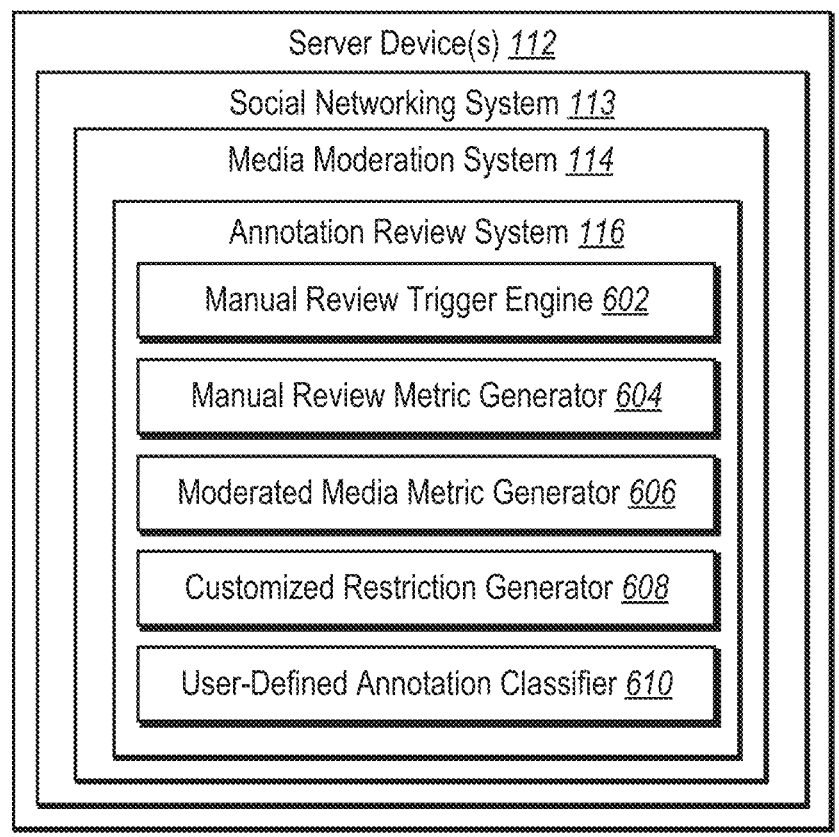
FIG. 6 illustrates a block diagram of an example computing device for implementing one or more embodiments of the present disclosure.
Figure 7:
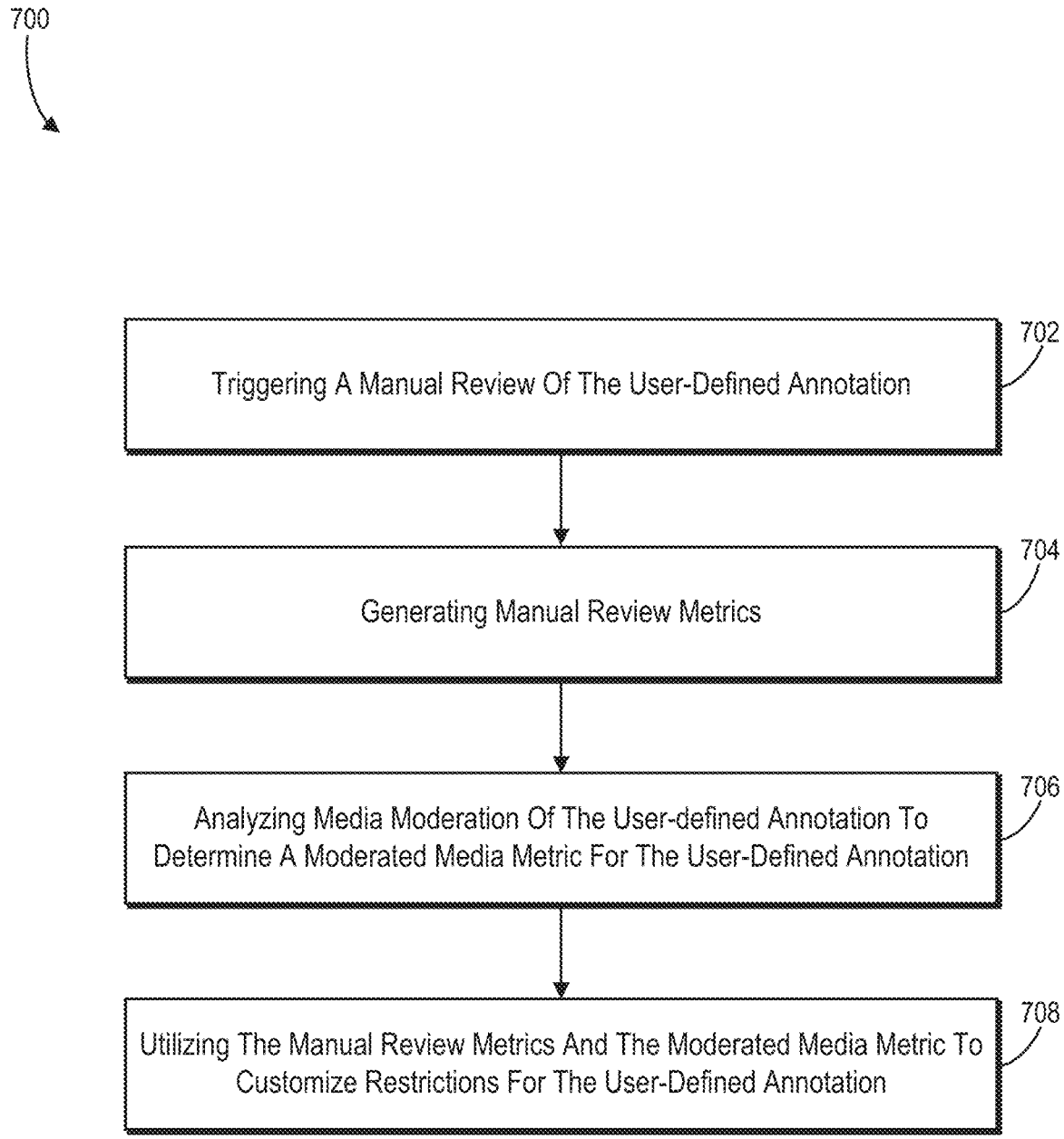
FIG. 7 illustrates a flowchart of a series of acts for an annotation review system in accordance with one or more embodiments.

Referring now to FIG. 6, additional detail will be provided regarding capabilities and components of the digital summary generation system 114 in accordance with one or more embodiments. In particular, FIG. 7 shows a schematic diagram of an example architecture 600 of the annotation review system 116 hosted on server device(s) 112. The annotation review system 116 can represent one or more embodiments of the annotation review system 116 described previously. As shown, the digital summary generation system 114 is located on server device(s) 112 as part of the media moderation system 114, which is itself part of a social networking system 113, as described above. In general, the annotation review system 116 may be implemented on various types of computing devices (e.g. the server device(s) 112 or the client device 102).

Each of the components 602-610 of the annotation review system 116 can include software, hardware, or both. For example, the components 602-610 can include one or more instructions stored on a computer-readable storage medium and executable by processors of one or more computing devices, such as a client device or server device. When executed by the one or more processors, the computer-executable instructions of the annotation review system 116 can cause the computing device(s) to perform the methods described herein. Alternatively, the components 602-610 can include hardware, such as a special-purpose processing device to perform a certain function or group of functions. Alternatively, the components 602-610 of the annotation review system 116 can include a combination of computer-executable instructions and hardware.

Furthermore, the components 602-610 of the annotation review system 116 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 602-610 may be implemented as a stand-alone application, such as a desktop or mobile application. Furthermore, the components 602-610 may be implemented as one or more web-based applications hosted on a remote server. The components 602-610 may also be implemented in a suite of mobile device applications or "apps."

As illustrated in FIG. 6, the annotation review system 116 includes various components for performing the processes and functions described herein. For example, the annotation review system 116 includes the manual review trigger engine 602, the manual review metric generator 604, the moderated media metric generator 606, the customized restriction generator 608, and the user-defined annotation classifier 610. Each of these components is described below in turn.

As shown in FIG. 6, the annotation review system 116 can include a manual review trigger engine 602. The manual review trigger engine 602 can identify user-defined annotations for manual review based on user reports, system classification of the user-defined annotation, analysis of the actions of an auto-moderation system, and/or the restriction status of associated user-defined annotations. In one or more embodiments, the manual review trigger engine generates various metrics based on these factors to determine whether a user-defined annotation should be presented for manual review. Further, the manual review trigger engine 602 can determine a geographical region or other location for a user-defined annotation based on the language and locations associated with content posts that include the user-defined annotation. Then, in one or more embodiments, the manual review trigger engine 602 sends representative content from the user-defined annotation for manual review by an administrator associated with the identified location.

Further, as shown in FIG. 6, the annotation review system 116 can include a manual review metric generator 604. The manual review metric generator 604 can interpret administrator input from a manual review process to determine various manual review metrics. The manual review metric generator can receive input data via the administrator device 106 and, as mentioned above, can be implemented in whole or in part on the server device(s) 112 or the administrator device 106. More specifically, the manual review metric generator 604 can determine various metrics for violation of community guidelines and/or terms and services of an online service. For example, the manual review metric generator 604 can generate a metric for the total or overall violation within a user-defined annotation (e.g., a total violation score), the violation within recent posts for the user-defined annotation (e.g., a recent violation score), and the violation within top posts for the user-defined annotation (e.g., a top violation score).

As shown in FIG. 6, the annotation review system 116 can also include a moderated media metric generator 606. The moderated media metric generator 606 can determine a metric based at least on the auto-moderation of a user-defined annotation. For example, the moderated media metric generator 606 can generate a moderated media metric based at least on the percentage of posts including the user-defined annotation deleted by an auto-moderation system. In one or more other embodiments, the user-defined annotation may be further based on user reports and/or the restriction status of associated user-defined annotations.

Additionally, as shown in FIG. 6, the annotation review system 116 can include a customized restriction generator 608. The customized restriction generator 608 can utilize manual review metrics and the automated media metric for a user-defined annotation to determine a customized set of restrictions for the user-defined annotation. In one or more embodiments, the customized restriction generator may also utilize a system-assigned classification for the user-defined annotation to generate restrictions for the user-defined annotation. For example, the customized restriction generator 608 can determine that a user-defined annotation should, either indefinitely or for a predetermined time period, receive a modified content page or be blocked from search functionality and/or maintaining a content page at all.

Also, as shown in FIG. 6, the annotation review system 116 can include a user-defined annotation classifier 610. The user-defined annotation classifier 610 can determine classifications for a user-defined annotation. For example, the user-defined annotation classifier 610 can classify user-defined annotations into tiers, levels, or other classifications. The user-defined annotation classifier 610 can number, label, or otherwise name the classifications. In one or more embodiments, the user-defined annotation classifier 610 can assign user-defined annotations into very positive, positive, neutral, negative, or very negative numbered tiers. The user-defined annotation classifier 610 can determine how to classify user-defined annotations based on the restrictions assigned to a user-defined annotation and, in some circumstances, time elapsed since the assignment of the restrictions.

FIGS. 1-7, the corresponding text, and the examples provide a number of different methods, systems, devices, and non-transitory computer-readable media of the annotation review system 116. In addition to the foregoing, one or more embodiments can also be described in terms of flowcharts comprising acts for accomplishing a particular result, as shown in FIG. 7. FIG. 7 may be performed with more or fewer acts. Further, the acts may be performed in differing orders. Additionally, the acts described herein may be repeated or performed in parallel with one another or parallel with different instances of the same or similar acts.

As mentioned, FIG. 7 illustrates a flowchart of a series of acts 700 for the annotation review system 116 in accordance with one or more embodiments. While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer-readable medium can comprise instructions that, when executed by one or more processors, cause a computing device to perform the acts of FIG. 7. In some embodiments, a system can perform the acts of FIG. 7.

As shown in FIG. 7, the series of acts 700 includes an act 702 for triggering a manual review of the user-defined annotation. In particular, the act 702 can include triggering, based on information associated with a user-defined annotation, a manual review of media associated with a user-defined annotation.

As shown in FIG. 7, the series of acts 700 includes an act 704 for generating manual review metrics. In particular, the act 704 can include generating, based on the manual review of the media associated with the user-defined annotation, one or more manual review metrics. Specifically, the act 704 can include generating at least one of a violation percentage for top media associated with the user-defined annotation, a violation percentage for recent media associated with the user-defined annotation, or an overall violation percentage for media associated with the user-defined annotation.

As shown in FIG. 7, the series of acts 700 includes an act 706 for analyzing media moderation of the user-defined annotation to determine a moderated media metric for the user-defined annotation. In particular, the act 706 can include analyzing media moderation associated with the user-defined annotation to determine a moderated media metric associated with the user-defined annotation. Specifically, the act 706 can include determining a percent of media comprising the user-defined annotation deleted for violating one or more guidelines, terms, and/or conditions of a social networking system.

As shown in FIG. 7, the series of acts 700 includes an act 708 for utilizing the manual review metrics and the moderated media metric to customize restrictions for the user-defined annotation. In particular, the act 708 can include utilizing the manual review metrics and the moderated media metric to customize a set of restrictions for the user-defined annotation. Specifically, the act 708 can include comparing the manual review metrics to one or more manual review thresholds and comparing the moderated media metric to a moderated media threshold. Further, the act 708 can include identifying, for the user-defined annotation, a classification, wherein the classification is selected from a plurality of classifications comprising a positive classification, a neutral classification, and a negative classification. The act 708 can also include determining a prior classification associated with the user-defined annotation, and customizing a manual review based on the prior classification.

Additionally, the act 708 can include determining that a total violation score for the user-defined annotation is above a total violation threshold, determining that a recent violation score for the user-defined annotation is above a recent violation threshold, determining that the moderated media metric is above a moderated media threshold, and selecting a block restriction for the user-defined annotation. The act 708 can also include determining that a total violation score for the user-defined annotation is above a total violation threshold, determining that a recent violation score for the user-defined annotation is below a recent violation threshold, determining that the moderated media metric is below a moderated media threshold, and based on the plurality of determinations, selecting a modified content page restriction for the user-defined annotation, wherein the modified content page restriction comprises an expiration.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 8:
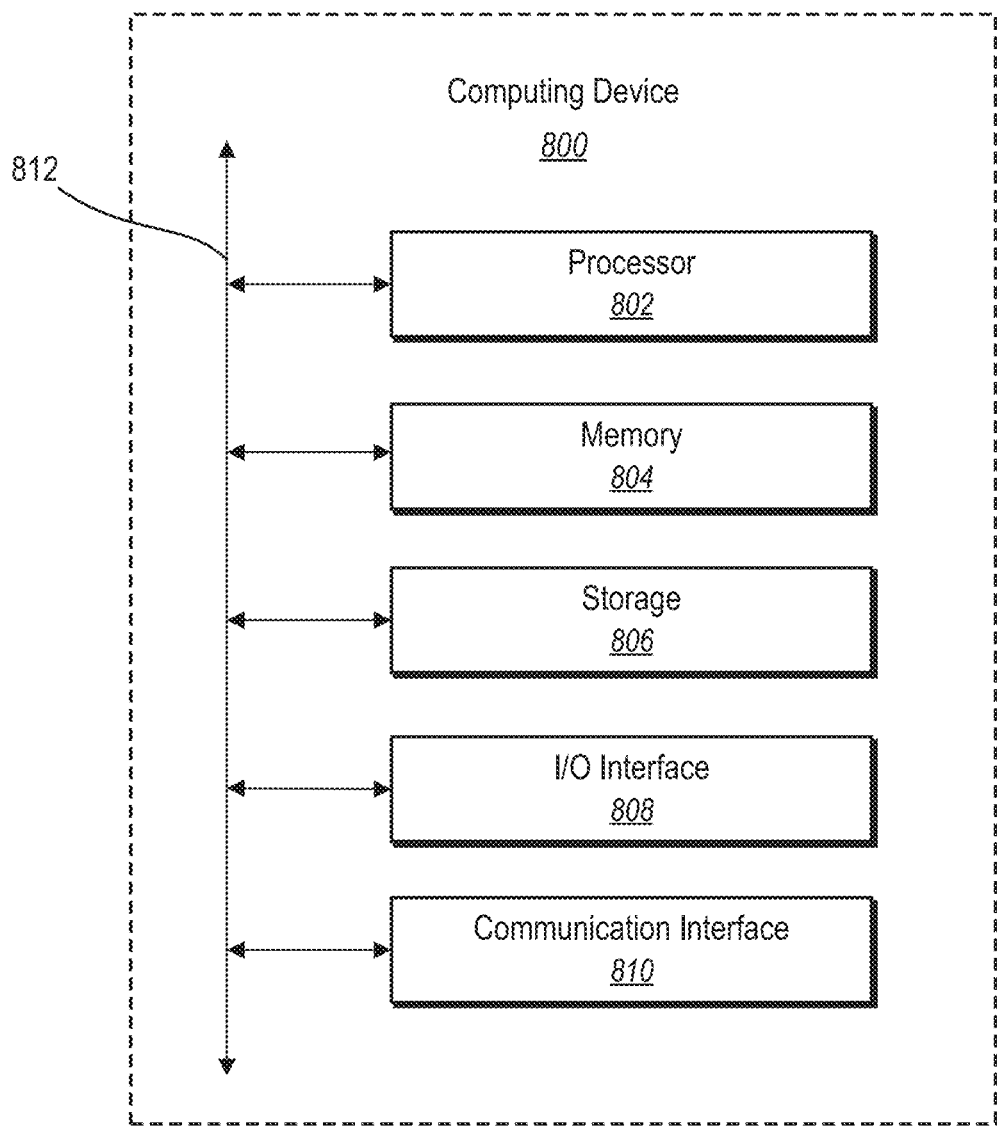
FIG. 8 illustrates a block diagram of an example computing device in accordance with one or more embodiments.

FIG. 8 illustrates a block diagram of an example computing device 800 that may be configured to perform one or more of the processes described above. One will appreciate that one or more computing devices 800 may represent the computing devices described above (e.g., server device(s) 112, client device(s) 102*a-n*, and administrator device 106).

In one or more embodiments, the computing device 800 may be a mobile device (e.g., a mobile telephone, a smartphone, a PDA, a tablet, a laptop, a camera, a tracker, a watch, a wearable device, etc.). In some embodiments, the computing device 800 may be a non-mobile device (e.g., a desktop computer or another type of client device). Further, the computing device 800 may be a server device that includes cloud-based processing and storage capabilities.

As shown in FIG. 8, the computing device 800 can include one or more processor(s) 802, memory 804, a storage device 806, input/output interfaces 808 (or "I/O interfaces 808"), and a communication interface 810, which may be communicatively coupled by way of a communication infrastructure (e.g., bus 812). While the computing device 800 is shown in FIG. 8, the components illustrated in FIG. 8 are not intended to be limiting. Additional or alternative components may be used in other embodiments. Furthermore, in certain embodiments, the computing device 800 includes fewer components than those shown in FIG. 8. Components of the computing device 800 shown in FIG. 8 will now be described in additional detail.

In particular embodiments, the processor(s) 802 includes hardware for executing instructions, such as those making up a computer program. As an example, and not by way of limitation, to execute instructions, the processor(s) 802 may retrieve (or fetch) the instructions from an internal register, an internal cache, memory 804, or a storage device 806 and decode and execute them.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 804 may be internal or distributed memory.

The computing device 800 includes a storage device 806 includes storage for storing data or instructions. As an example, and not by way of limitation, the storage device 806 can include a non-transitory storage medium described above. The storage device 806 may include a hard disk drive (HDD), flash memory, a Universal Serial Bus (USB) drive or a combination these or other storage devices.

As shown, the computing device 800 includes one or more I/O interfaces 808, which are provided to allow a user to provide input to (such as user strokes), receive output from, and otherwise transfer data to and from the computing device 800. These I/O interfaces 808 may include a mouse, keypad or a keyboard, a touch screen, camera, optical scanner, network interface, modem, other known I/O devices or a combination of such I/O interfaces 808. The touch screen may be activated with a stylus or a finger.

The I/O interfaces 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 808 are configured to provide graphical data to a display for presentation to a user. The graphical data may be representative of one or more graphical user interfaces and/or any other graphical content as may serve a particular implementation.

The computing device 800 can further include a communication interface 810. The communication interface 810 can include hardware, software, or both. The communication interface 810 provides one or more interfaces for communication (such as, for example, packet-based communication) between the computing device and one or more other computing devices or one or more networks. As an example, and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI.

Additionally, or alternatively, the communication interface 610 may facilitate communications with an ad hoc network, a personal area network ("PAN"), a local area network ("LAN"), a wide area network ("WAN"), a metropolitan area network ("MAN"), or one or more portions of the Internet or a combination of two or more of these. One or more portions of one or more of these networks may be wired or wireless. As an example, the communication interface 610 may facilitate communications with a wireless PAN ("WPAN") (such as, for example, a BLUETOOTH WPAN), a WI-FI network, a WI-MAX network, a cellular telephone network (such as, for example, a Global System for Mobile Communications ("GSM") network), or other suitable wireless network or a combination thereof.

Additionally, the communication interface 610 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

As mentioned above, the annotation review system 116 can include, be implemented in, or be associated with a social networking system 113. A social-networking system 113 may enable its users (such as persons or organizations) to interact with the system and with each other. The social-networking system 113 may, with input from a user, create and store in the social-networking system a user profile associated with the user. The user profile may include demographic information, communication-channel information, and information on personal interests of the user. The social-networking system 113 may also, with input from a user, create and store a record of relationships of the user with other users of the social-networking system, as well as provide services (e.g. wall posts, photo-sharing, on-line calendars and event organization, messaging, games, or advertisements) to facilitate social interaction between or among users. Also, the social-networking system 113 may allow users to post photographs and other visual media items to a user's profile page (typically known as "wall posts" or "timeline posts") or in a photo album, both of which may be accessible to other users of the social-networking system depending upon the user's configured privacy settings.

Figure 9:
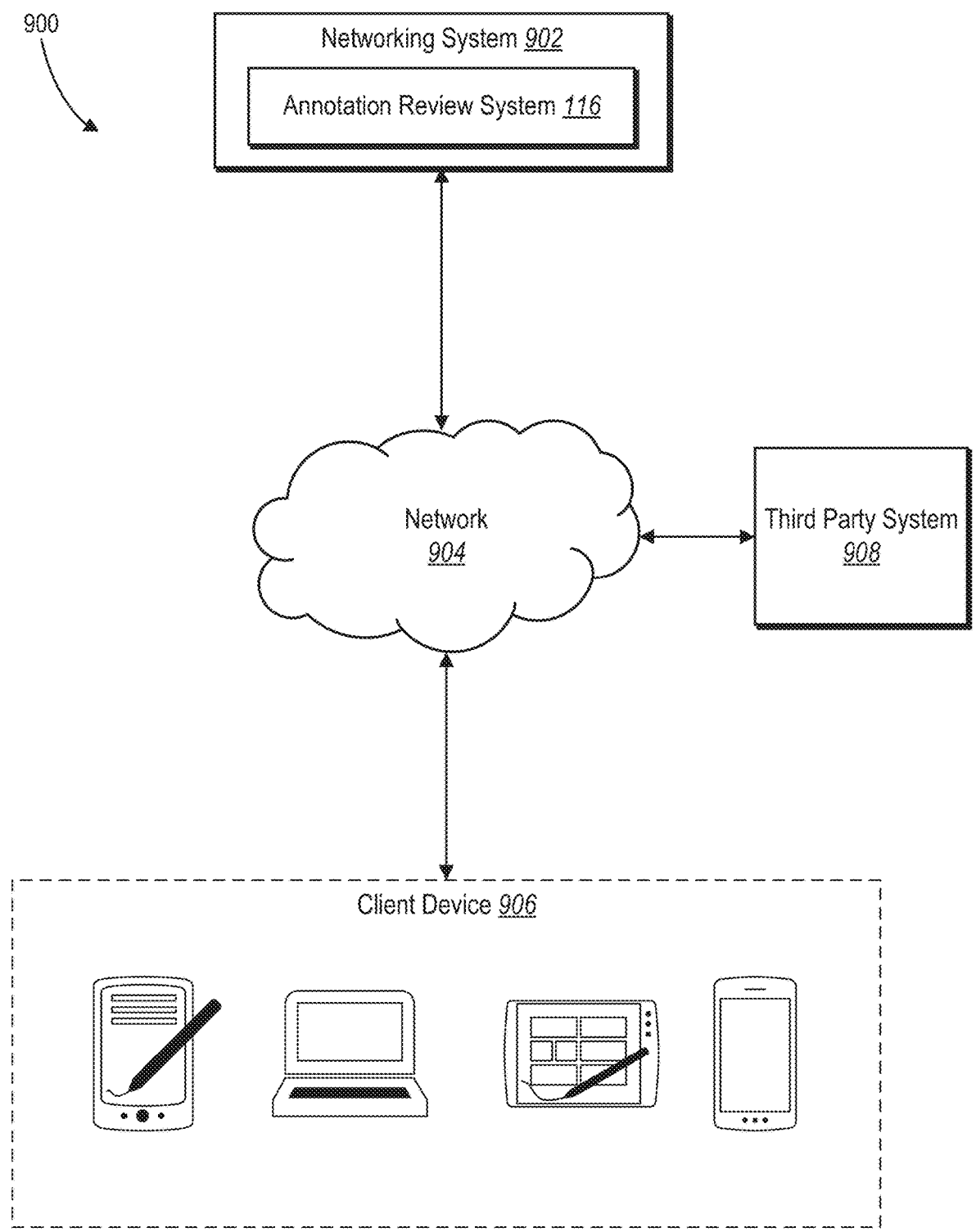
FIG. 9 illustrates an example network environment for a social networking system in accordance with one or more embodiments.

FIG. 9 illustrates an example network environment 900 of a social networking system. Network environment 900 includes a client device 906, a networking system 902, and a third-party system 908 (e.g., a video provider system) connected to each other by a network 904. Although FIG. 9 illustrates a particular arrangement of client device 906, networking system 902, third-party system 908, and network 904, this disclosure contemplates any suitable arrangement of client device 906, networking system 902, third-party system 908, and network 904. As an example and not by way of limitation, two or more of client device 906, networking system 902, and third-party system 908 may be connected to each other directly, bypassing network 904. As another example, two or more of client device 906, networking system 902, and third-party system 908 may be physically or logically co-located with each other in whole or in part. Moreover, although FIG. 9 illustrates a particular number of client devices 906, social networking systems 902, third-party systems 908, and networks 904, this disclosure contemplates any suitable number of client devices 906, social networking systems 902, third-party systems 908, and networks 904. As an example and not by way of limitation, network environment 900 may include multiple client devices 906, social networking systems 902, third-party systems 908, and networks 904.

This disclosure contemplates any suitable network 904. As an example and not by way of limitation, one or more portions of network 904 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 904 may include one or more networks 904.

Links may connect client device 906, networking system 902, and third-party system 908 to communication network 904 or to each other. This disclosure contemplates any suitable links. In particular embodiments, one or more links include one or more wireline (such as for example Digital Subscriber Line ("DSL") or Data Over Cable Service Interface Specification ("DOCSIS")), wireless (such as for example Wi-Fi or Worldwide Interoperability for Microwave Access ("WiMAX")), or optical (such as for example Synchronous Optical Network ("SONET") or Synchronous Digital Hierarchy ("SDH")) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 900. One or more first links may differ in one or more respects from one or more second links.

In particular embodiments, client device 906 may be an electronic device including hardware, software, or embedded logic components or a combination of two or more such components and capable of carrying out the appropriate functionalities implemented or supported by client device 906. As an example and not by way of limitation, a client device 906 may include any of the computing devices discussed above in relation to FIG. 9. A client device 906 may enable a network user at client device 906 to access network 904. A client device 906 may enable its user to communicate with other users at other client devices 906.

In particular embodiments, client device 906 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client device 906 may enter a Uniform Resource Locator ("URL") or other address directing the web browser to a particular server (such as server, or a server associated with a third-party system 908), and the web browser may generate a Hyper Text Transfer Protocol ("HTTP") request and communicate the HTTP request to server. The server may accept the HTTP request and communicate to client device 906 one or more Hyper Text Markup Language ("HTML") files responsive to the HTTP request. Client device 906 may render a webpage based on the HTML files from the server for presentation to the user. This disclosure contemplates any suitable webpage files. As an example and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, networking system 902 may be a network-addressable computing system that can host an online social network. Networking system 902 may generate, store, receive, and send social-networking data, such as, for example, user-profile data, concept-profile data, social-graph information, or other suitable data related to the online social network. Networking system 902 may be accessed by the other components of network environment 900 either directly or via network 904. In particular embodiments, networking system 902 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, networking system 902 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 906, a networking system 902, or a third-party system 908 to manage, retrieve, modify, add, or delete, the information stored in data store.

In particular embodiments, networking system 902 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Networking system 902 may provide users of the online social network the ability to communicate and interact with other users. In particular embodiments, users may join the online social network via networking system 902 and then add connections (e.g., relationships) to a number of other users of networking system 902 whom they want to be connected to. Herein, the term "friend" may refer to any other user of networking system 902 with whom a user has formed a connection, association, or relationship via networking system 902.

In particular embodiments, networking system 902 may provide users with the ability to take actions on various types of items or objects, supported by networking system 902. As an example and not by way of limitation, the items and objects may include groups or social networks to which users of networking system 902 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in networking system 902 or by an external system of third-party system 908, which is separate from networking system 902 and coupled to networking system 902 via a network 904.

In particular embodiments, networking system 902 may be capable of linking a variety of entities. As an example and not by way of limitation, networking system 902 may enable users to interact with each other as well as receive content from third-party systems 908 or other entities, or to allow users to interact with these entities through an application programming interfaces ("API") or other communication channels.

In particular embodiments, a third-party system 908 may include one or more types of servers, one or more data stores, one or more interfaces, including but not limited to APIs, one or more web services, one or more content sources, one or more networks, or any other suitable components, e.g., that servers may communicate with. A third-party system 908 may be operated by a different entity from an entity operating networking system 902. In particular embodiments, however, networking system 902 and third-party systems 908 may operate in conjunction with each other to provide social-networking services to users of networking system 902 or third-party systems 908. In this sense, networking system 902 may provide a platform, or backbone, which other systems, such as third-party systems 908, may use to provide social-networking services and functionality to users across the Internet.

In particular embodiments, a third-party system 908 may include a third-party content object provider. A third-party content object provider may include one or more sources of content objects, which may be communicated to a client device 906. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, networking system 902 also includes user-generated content objects, which may enhance a user's interactions with networking system 902. User-generated content may include anything a user can add, upload, send, or "post" to networking system 902. As an example and not by way of limitation, a user communicates posts to networking system 902 from a client device 906. Posts may include data such as status updates or other textual data, location information, photos, videos, links, music or other similar data or media. Content may also be added to networking system 902 by a third-party through a "communication channel," such as a newsfeed or stream.

In particular embodiments, networking system 902 may include a variety of servers, sub-systems, programs, modules, logs, and data stores. In particular embodiments, networking system 902 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Networking system 902 may also include suitable components such as network interfaces, security mechanisms, load balancers, failover servers, management-and-network-operations consoles, other suitable components, or any suitable combination thereof. In particular embodiments, networking system 902 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking networking system 902 to one or more client devices 906 or one or more third-party system 908 via network 904. The web server may include a mail server or other messaging functionality for receiving and routing messages between networking system 902 and one or more client devices 906. An API-request server may allow a third-party system 908 to access information from networking system 902 by calling one or more APIs. An action logger may be used to receive communications from a web server about a user's actions on or off networking system 902. In conjunction with the action log, a third-party-content-object log may be maintained of user exposures to third-party-content objects. A notification controller may provide information regarding content objects to a client device 906. Information may be pushed to a client device 906 as notifications, or information may be pulled from client device 906 responsive to a request received from client device 906. Authorization servers may be used to enforce one or more privacy settings of the users of networking system 902. A privacy setting of a user determines how particular information associated with a user can be shared. The authorization server may allow users to opt in to or opt out of having their actions logged by networking system 902 or shared with other systems (e.g., third-party system 908), such as, for example, by setting appropriate privacy settings. Third-party-content-object stores may be used to store content objects received from third parties, such as a third-party system 908. Location stores may be used for storing location information received from client devices 906 associated with users. Advertisement-pricing modules may combine social information, the current time, location information, or other suitable information to provide relevant advertisements, in the form of notifications, to a user.

Figure 10:
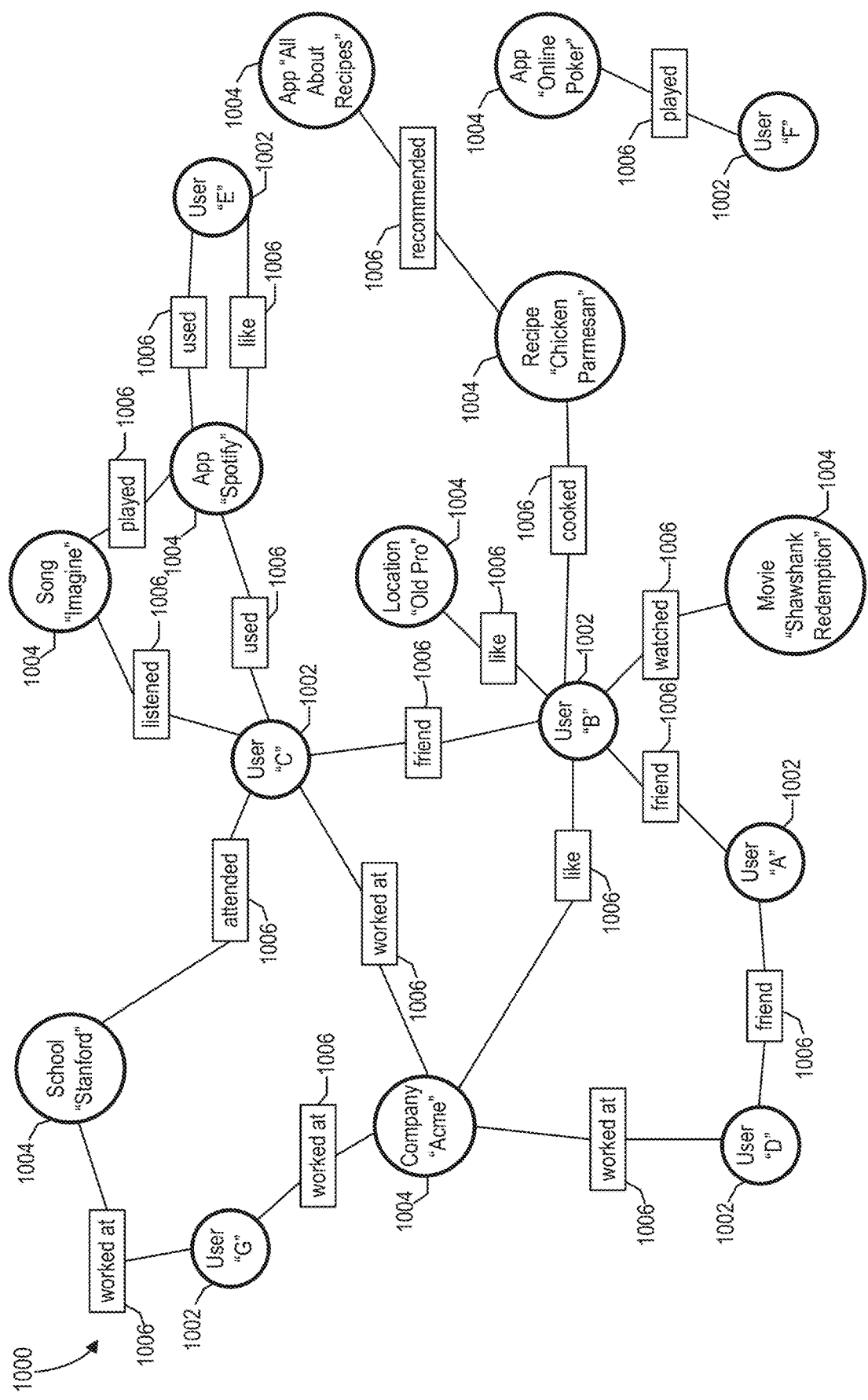
FIG. 10 illustrates

FIG. 10 illustrates example social graph 1000. In particular embodiments, networking system 902 may store one or more social graphs 1000 in one or more data stores and utilize the stored data for customizing features and services for users (e.g., for customizing video distribution for users). In particular embodiments, social graph 1000 may include multiple nodes—which may include multiple user nodes 1002 or multiple concept nodes 1004—and multiple edges 1006 connecting the nodes. Example social graph 1000 illustrated in FIG. 10 is shown, for didactic purposes, in a two-dimensional visual map representation. In particular embodiments, a networking system 902, client device 906, or third-party system 908 may access social graph 1000 and related social-graph information for suitable applications. The nodes and edges of social graph 1000 may be stored as data objects, for example, in a data store (such as a social-graph database). Such a data store may include one or more searchable or query able indexes of nodes or edges of social graph 1000.

In particular embodiments, a user node 1002 may correspond to a user of networking system 902. As an example and not by way of limitation, a user may be an individual (human user), an entity (e.g., an enterprise, business, or third-party application), or a group (e.g., of individuals or entities) that interacts or communicates with or over networking system 902. In particular embodiments, when a user registers for an account with networking system 902, networking system 902 may create a user node 1002 corresponding to the user and store the user node 1002 in one or more data stores. Users and user nodes 1002 described herein may, where appropriate, refer to registered users and user nodes 1002 associated with registered users. In addition, or as an alternative, users and user nodes 1002 described herein may, where appropriate, refer to users that have not registered with networking system 902. In particular embodiments, a user node 1002 may be associated with information provided by a user or information gathered by various systems, including networking system 902. As an example and not by way of limitation, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social-networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 1004 may correspond to a concept. As an example and not by way of limitation, a concept may correspond to a place (such as, for example, a movie theater, restaurant, landmark, or city); a website (such as, for example, a website associated with networking system 902 or a third-party website associated with a web-application server); an entity (such as, for example, a person, business, group, sports team, or celebrity); a resource (such as, for example, an audio file, video file, digital photo, text file, structured document, or application) which may be located within networking system 902 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1004 may be associated with information of a concept provided by a user or information gathered by various systems, including networking system 902. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1004 may be associated with one or more data objects corresponding to information associated with concept nodes 1004. In particular embodiments, a concept node 1004 may correspond to one or more webpages.

In particular embodiments, a node in social graph 1000 may represent or be represented by a webpage (which may be referred to as a "profile page"). Profile pages may be hosted by or accessible to networking system 902. Profile pages may also be hosted on third-party websites associated with a third-party system 908. As an example and not by way of limitation, a profile page corresponding to a particular external webpage may be the particular external webpage and the profile page may correspond to a particular concept node 1004. Profile pages may be viewable by all or a selected subset of other users. As an example and not by way of limitation, a user node 1002 may have a corresponding user-profile page in which the corresponding user may add content, make declarations, or otherwise express himself or herself. As another example and not by way of limitation, a concept node 1004 may have a corresponding concept-profile page in which one or more users may add content, make declarations, or express themselves, particularly in relation to the concept corresponding to concept nodes 1004.

In particular embodiments, a concept node 1004 may represent a third-party webpage or resource hosted by a third-party system 908. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client device 906 to send to networking system 902 a message indicating the user's action. In response to the message, networking system 902 may create an edge (e.g., an "eat" edge) between a user node 1002 corresponding to the user and a concept node 1004 corresponding to the third-party webpage or resource and store edge 1006 in one or more data stores.

In particular embodiments, a pair of nodes in social graph 1000 may be connected to each other by one or more edges 1006. An edge 1006 connecting a pair of nodes may represent a relationship between the pair of nodes. In particular embodiments, an edge 1006 may include or represent one or more data objects or attributes corresponding to the relationship between a pair of nodes. As an example and not by way of limitation, a first user may indicate that a second user is a "friend" of the first user. In response to this indication, networking system 902 may send a "friend request" to the second user. If the second user confirms the "friend request," networking system 902 may create an edge 1006 connecting the first user's user node 1002 to the second user's user node 1002 in social graph 1000 and store edge 1006 as social-graph information in one or more of data stores. In the example of FIG. 10, social graph 1000 includes an edge 1006 indicating a friend relation between user nodes 1002 of user "A" and user "B" and an edge indicating a friend relation between user nodes 1002 of user "C" and user "B." Although this disclosure describes or illustrates particular edges 1006 with particular attributes connecting particular user nodes 1002, this disclosure contemplates any suitable edges 1006 with any suitable attributes connecting user nodes 1002. As an example and not by way of limitation, an edge 1006 may represent a friendship, family relationship, business or employment relationship, fan relationship, follower relationship, visitor relationship, sub scriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1000 by one or more edges 1006.

In particular embodiments, an edge 1006 between a user node 1002 and a concept node 1004 may represent a particular action or activity performed by a user associated with user node 1002 toward a concept associated with a concept node 1004. As an example and not by way of limitation, as illustrated in FIG. 10, a user may "like," "attended," "played," "listened," "cooked," "worked at," or "watched" a concept, each of which may correspond to an edge type or subtype. A concept-profile page corresponding to a concept node 1004 may include, for example, a selectable "check in" icon (such as, for example, a clickable "check in" icon) or a selectable "add to favorites" icon. Similarly, after a user clicks these icons, networking system 902 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, networking system 902 may create a "listened" edge 1006 and a "used" edge (as illustrated in FIG. 10) between user nodes 1002 corresponding to the user and concept nodes 1004 corresponding to the song and application to indicate that the user listened to the song and used the application. Moreover, networking system 902 may create a "played" edge 1006 (as illustrated in FIG. 10) between concept nodes 1004 corresponding to the song and the application to indicate that the particular song was played by the particular application. In this case, "played" edge 1006 corresponds to an action performed by an external application (SPOTIFY) on an external audio file (the song "Imagine"). Although this disclosure describes particular edges 1006 with particular attributes connecting user nodes 1002 and concept nodes 1004, this disclosure contemplates any suitable edges 1006 with any suitable attributes connecting user nodes 1002 and concept nodes 1004. Moreover, although this disclosure describes edges between a user node 1002 and a concept node 1004 representing a single relationship, this disclosure contemplates edges between a user node 1002 and a concept node 1004 representing one or more relationships. As an example and not by way of limitation, an edge 1006 may represent both that a user likes and has used at a particular concept. Alternatively, another edge 1006 may represent each type of relationship (or multiples of a single relationship) between a user node 1002 and a concept node 1004 (as illustrated in FIG. 10 between user node 1002 for user "E" and concept nodes 1004 for "SPOTIFY").

In particular embodiments, networking system 902 may create an edge 1006 between a user node 1002 and a concept node 1004 in social graph 1000. As an example and not by way of limitation, a user viewing a concept-profile page (such as, for example, by using a web browser or a special-purpose application hosted by the user's client device 906) may indicate that he or she likes the concept represented by the concept nodes 1004 by clicking or selecting a "Like" icon, which may cause the user's client device 906 to send to networking system 902 a message indicating the user's liking of the concept associated with the concept-profile page. In response to the message, networking system 902 may create an edge 1006 between user node 1002 associated with the user and concept nodes 1004, as illustrated by "like" edge 1006 between the user and concept nodes 1004. In particular embodiments, networking system 902 may store an edge 1006 in one or more data stores. In particular embodiments, an edge 1006 may be automatically formed by networking system 902 in response to a particular user action. As an example and not by way of limitation, if a first user uploads a picture, watches a movie, or listens to a song, an edge 1006 may be formed between user node 1002 corresponding to the first user and concept nodes 1004 corresponding to those concepts. Although this disclosure describes forming particular edges 1006 in particular manners, this disclosure contemplates forming any suitable edges 1006 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition, or as an alternative, an advertisement may be one or more sponsored stories (e.g., a news-feed or ticker item on networking system 902). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, networking system 902 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through networking system 902) or RSVP (e.g., through networking system 902) to an event associated with the advertisement. In addition or as an alternative, an advertisement may include social-networking-system context directed to the user. As an example and not by way of limitation, an advertisement may display information about a friend of the user within networking system 902 who has taken an action associated with the subject matter of the advertisement.

In particular embodiments, networking system 902 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 908 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, networking system 902 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part based on the history of the user's actions. Coefficients may be used to predict any number of actions, which may be within or outside of the online social network. As an example and not by way of limitation, these actions may include various types of communications, such as sending messages, posting content, or commenting on content; various types of an observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, networking system 902 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the networking system 902 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, networking system 902 may determine coefficients using machinelearning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, networking system 902 may calculate a coefficient based on a user's actions. Networking system 902 may monitor such actions on the online social network, on a third-party system 908, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, networking system 902 may calculate a coefficient based on the user's actions with particular types of content. The content may be associated with the online social network, a third-party system 908, or another suitable system. The content may include users, profile pages, posts, news stories, headlines, instant messages, chat room conversations, emails, advertisements, pictures, video, music, other suitable objects, or any combination thereof. Networking system 902 may analyze a user's actions to determine whether one or more of the actions indicate an affinity for subject matter, content, other users, and so forth. As an example and not by way of limitation, if a user may make frequently posts content related to "coffee" or variants thereof, networking system 902 may determine the user has a high coefficient with respect to the concept "coffee." Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, networking system 902 may calculate a coefficient based on the type of relationship between particular objects. Referencing the social graph 1000, networking system 902 may analyze the number and/or type of edges 1006 connecting particular user nodes 1002 and concept nodes 1004 when calculating a coefficient. As an example and not by way of limitation, user nodes 1002 that are connected by a spouse-type edge (representing that the two users are married) may be assigned a higher coefficient than user nodes 1002 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, networking system 902 may determine that the user has a higher coefficient with respect to the first photo than the second photo because having a tagged-in-type relationship with content may be assigned a higher weight and/or rating than having a like-type relationship with content. In particular embodiments, networking system 902 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, networking system 902 may determine that the first user should also have a relatively high coefficient for the particular object. In particular embodiments, the coefficient may be based on the degree of separation between particular objects. Degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 1000. As an example and not by way of limitation, social-graph entities that are closer in the social graph 1000 (i.e., fewer degrees of separation) may have a higher coefficient than entities that are further apart in the social graph 1000.

In particular embodiments, networking system 902 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client device 906 of the user). A first user may be more interested in other users or concepts that are closer to the first user. As an example and not by way of limitation, if a user is one mile from an airport and two miles from a gas station, networking system 902 may determine that the user has a higher coefficient for the airport than the gas station based on the proximity of the airport to the user.

In particular embodiments, networking system 902 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, networking system 902 may provide information that is relevant to user's interests and current circumstances, increasing the likelihood that they will find such information of interest. In particular embodiments, networking system 902 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, networking system 902 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, networking system 902 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 908 (e.g., via an API or other communication channel), or from another suitable system. In response to the request, networking system 902 may calculate the coefficient (or access the coefficient information if it has previously been calculated and stored). In particular embodiments, networking system 902 may measure an affinity with respect to a particular process. Different processes (both internal and external to the online social network) may request a coefficient for a particular object or set of objects. Networking system 902 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or acts disclosed in U.S. patent application Ser. No. 11/503,093, filed 11 Aug. 2006, U.S. patent application Ser. No. 12/978,027, filed 22 Dec. 2010, U.S. patent application Ser. No. 12/978,265, filed 23 Dec. 2010, and U.S. patent application Ser. No. 13/642,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 1004 corresponding to a particular photo may have a privacy setting specifying that the photo may only be accessed by users tagged in the photo and their friends. In particular embodiments, privacy settings may allow users to opt in or opt out of having their actions logged by networking system 902 or shared with other systems (e.g., third-party system 908). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 908, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, networking system 902 may send a request to the data store for the object. The request may identify the user associated with the request and may only be sent to the user (or a client device 906 of the user) if the authorization server determines that the user is authorized to access the object based on the privacy settings associated with the object. If the requesting user is not authorized to access the object, the authorization server may prevent the requested object from being retrieved from the data store or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific example embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A computerized method comprising:
triggering, based on user reports associated with a user-defined annotation, a manual review of media associated with the user-defined annotation via a review system, wherein the user-defined annotation comprises a hashtag;
generating, based on user interaction with content associated with the user-defined annotation, a representative set of content items associated with the user-defined annotation for presentation to an administrator device for manual review, wherein the representative set of content items comprises a plurality of content items;
generating, via the review system a review graphical user interface comprising an organization of the representative set of content items by:
determining, via the review system and from the representative set of content items, a first plurality of content items that include the user-defined annotation and have top numbers of user engagements;
determining, via the review system and from the representative set of content items, a second plurality of content items that include the user-defined annotation were posted most recently; and
providing the first plurality of content items and the second plurality of content items together with the review graphical user interface;
generating, based on the manual review of the representative set of content items associated with the user-defined annotation via the review graphical user interface, one or more manual review metrics;
analyzing media moderation associated with the user-defined annotation to determine a moderated media metric associated with the user-defined annotation; and
utilizing the one or more manual review metrics and the moderated media metric to customize a set of restrictions for the user-defined annotation.

2. The computerized method of claim 1, wherein utilizing the one or more manual review metrics and the moderated media metric comprises comparing the one or more manual review metrics to one or more manual review thresholds and comparing the moderated media metric to a moderated media threshold.

3. The computerized method of claim 1, wherein generating the one or more manual review metrics comprises utilizing the representative set of content items to generate at least one of a violation percentage for top media associated with the user-defined annotation, a violation percentage for recent media associated with the user-defined annotation, or an overall violation percentage for media associated with the user-defined annotation.

4. The computerized method of claim 1, further comprising identifying, for the user-defined annotation, a classification, wherein the classification is selected from a plurality of classifications comprising a positive classification, a neutral classification, and a negative classification.

5. The computerized method of claim 4, further comprising:
determining a prior classification associated with the user-defined annotation; and
customizing the manual review based on the prior classification.

6. The computerized method of claim 1, wherein analyzing the media moderation comprises determining a percent of media comprising the user-defined annotation deleted for violating one or more guidelines, terms, and/or conditions of a social networking system.

7. The computerized method of claim 1, wherein utilizing the one or more manual review metrics and the moderated media metric to select a restriction level comprises:
determining that a total violation score reflecting a total percentage of violation of the media from the manual review for the user-defined annotation is above a total violation threshold;
determining that a recent violation score reflecting a percentage of violation of recent media from the manual review for the user-defined annotation is above a recent violation threshold;
determining that the moderated media metric is above a moderated media threshold; and
selecting a block restriction for the user-defined annotation.

8. The computerized method of claim 1, wherein utilizing the one or more manual review metrics and the moderated media metric to select a restriction level comprises:
determining that a total violation score reflecting a total percentage of violation of the media from the manual review for the user-defined annotation is above a total violation threshold;
determining that a recent violation score reflecting a percentage of violation of recent media from the manual review for the user-defined annotation is below a recent violation threshold;
determining that the moderated media metric is below a moderated media threshold; and
selecting a modified content page restriction for the user-defined annotation, wherein the modified content page restriction comprises an expiration.

9. A non-transitory computer-readable medium storing instructions that, when executed by at least one processor, cause a computer system to:
trigger, based on user reports associated with a user-defined annotation, a manual review of media associated with the user-defined annotation via a review system, wherein the user-defined annotation comprises a hashtag;
generate, based on user interaction with content associated with the user-defined annotation, a representative set of content items associated with the user-defined annotation for presentation to an administrator device for manual review, wherein the representative set of content items comprises a plurality of content items;
generate, via the review system a review graphical user interface comprising an organization of the representative set of content items by:
determine, via the review system and from the representative set of content items, a first plurality of content items that include the user-defined annotation and have top numbers of user engagements;
determine, via the review system and from the representative set of content items, a second plurality of content items that include the user-defined annotation were posted most recently; and
provide the first plurality of content items and the second plurality of content items together with the review graphical user interface;
generate, based on the manual review of the representative set of content items associated with the user-defined annotation via the review graphical user interface, one or more manual review metrics;

analyze media moderation associated with the user-defined annotation to determine a moderated media metric associated with the user-defined annotation; and utilize the one or more manual review metrics and the moderated media metric to customize a set of restrictions for the user-defined annotation.

10. The computer-readable medium of claim 9, wherein utilizing the one or more manual review metrics and the moderated media metric comprises comparing the one or more manual review metrics to one or more manual review thresholds and comparing the moderated media metric to a moderated media threshold.

11. The computer-readable medium of claim 9, wherein generating the one or more manual review metrics comprises utilizing the representative set of content items to generate at least one of a violation percentage for top media associated with the user-defined annotation, a violation percentage for recent media associated with the user-defined annotation, or an overall violation percentage for media associated with the user-defined annotation.

12. The computer-readable medium of claim 9, further comprising instructions that, when executed by the at least one processor, cause the computer system to identify, for the user-defined annotation, a classification, wherein the classification is selected from a plurality of classifications comprising a positive classification, a neutral classification, and a negative classification.

13. The computer-readable medium of claim 9, further comprising instructions that, when executed by the at least one processor, cause the computer system to:

determine a prior classification associated with the user-defined annotation; and customize a manual review based on the prior classification.

14. The computer-readable medium of claim 9, wherein analyzing the media moderation comprises determining a percent of media comprising the user-defined annotation deleted for violating one or more guidelines, terms, and/or conditions of a social networking system.

15. A system comprising:

at least one processor; and at least one non-transitory computer-readable storage medium storing instructions that, when executed by the at least one processor, cause the system to:

trigger, based on user reports associated with a user-defined annotation, a manual review of media associated with the user-defined annotation via a review system, wherein the user-defined annotation comprises a hashtag;

generate, based on user interaction with content associated with the user-defined annotation, a representative set of content items associated with the user-defined annotation for presentation to an administrator device for manual review, wherein the representative set of content items comprises a plurality of content items;

generate, via the review system a review graphical user interface comprising an organization of the representative set of content items by:

determine, via the review system and from the representative set of content items, a first plurality of content items that include the user-defined annotation and have top numbers of user engagements;

determine, via the review system and from the representative set of content items, a second plurality of content items that include the user-defined annotation were posted most recently; and provide the first plurality of content items and the second plurality of content items together with the review graphical user interface;

generate, based on the manual review of the representative set of content items associated with the user-defined annotation via the review graphical user interface, one or more manual review metrics;

analyze media moderation associated with the user-defined annotation to determine a moderated media metric associated with the user-defined annotation; and utilize the one or more manual review metrics and the moderated media metric to customize a set of restrictions for the user-defined annotation.

16. The system of claim 15, wherein utilizing the one or more manual review metrics and the moderated media metric comprises comparing the one or more manual review metrics to one or more manual review thresholds and comparing the moderated media metric to a moderated media threshold.

17. The system of claim 15, wherein generating the one or more manual review metrics comprises utilizing the representative set of content items to generate at least one of a violation percentage for top media associated with the user-defined annotation, a violation percentage for recent media associated with the user-defined annotation, or an overall violation percentage for media associated with the user-defined annotation.

18. The system of claim 15, further comprising instructions that, when executed by the at least one processor, cause the system to identify, for the user-defined annotation, a classification, wherein the classification is selected from a plurality of classifications comprising a positive classification, a neutral classification, and a negative classification.

19. The system of claim 15, further comprising instructions that, when executed by the at least one processor, cause the system to:

determine a prior classification associated with the user-defined annotation; and customize the manual review based on the prior classification.

20. The system of claim 15, wherein analyzing the media moderation comprises determining a percent of media comprising the user-defined annotation deleted for violating one or more guidelines, terms, and/or conditions of a social networking system.

\* \* \* \* \*